United States Patent [19]

Burton et al.

[11] Patent Number: 5,025,372

[45] Date of Patent: Jun. 18, 1991

[54] SYSTEM AND METHOD FOR ADMINISTRATION OF INCENTIVE AWARD PROGRAM THROUGH USE OF CREDIT

[75] Inventors: James F. Burton, Ladue; Daniel L. Henke, St. Louis, both of Mo.

[73] Assignee: Meridian Enterprises, Inc., St. Louis, Mo.

[21] Appl. No.: 412,570

[22] Filed: Sep. 25, 1989

Related U.S. Application Data

[63] Continuation of Ser. No. 98,008, Sep. 17, 1987, abandoned.

[51] Int. Cl.$^5$ ............................................. G06F 15/21
[52] U.S. Cl. ...................................... 364/406; 364/408
[58] Field of Search ............... 364/401, 406, 408, 410, 364/200 MS File, 900 MS File; 235/379, 380; 902/25-29, 41

[56] References Cited

U.S. PATENT DOCUMENTS

| | | | |
|---|---|---|---|
| 4,194,242 | 3/1980 | Robbins | 364/200 |
| 4,334,270 | 6/1982 | Towers | 364/300 |
| 4,346,442 | 8/1982 | Musmanno | 364/408 |
| 4,597,046 | 6/1986 | Musmanno | 364/408 |
| 4,694,397 | 9/1987 | Grant et al. | 235/379 X |
| 4,739,478 | 4/1988 | Roberts et al. | 235/379 X |
| 4,742,457 | 5/1988 | Leon et al. | 235/379 X |

FOREIGN PATENT DOCUMENTS

| | | |
|---|---|---|
| 0069432 | 4/1982 | Japan . |
| 2076201 | 11/1981 | United Kingdom . |
| 2161629 | 1/1986 | United Kingdom . |
| 2184029 | 6/1987 | United Kingdom . |

*Primary Examiner*—Joseph Ruggiero
*Attorney, Agent, or Firm*—Armstrong, Teasdale, Schlafly, Davis & Dicus

[57] ABSTRACT

Computer data processing, programming and printing for an improved incentive award program which allocates monetary amounts available for expenditure through credit instruments issued to program participants when the participants perform to a designated level of achievement. Participants identifying information and credit instrument account numbers are stored in memory. The incentive program can be divided into multiple time periods. Levels of performance are calculated and assigned for each participant in order for a monetary amount to be available for expenditure through the participant's credit instrument. Monetary amonts can be withheld from the amounts allocated to the instrument accounts. Adjustments can be made in the withheld amounts and in the achievement levels. Calculations, adjustment and reporting concerning amounts allocated for instrument use, withheld amounts, instrument transactions and account balances are made. Calculations and printed invoices for payment by a financial institution to an incentive company based on the credit instruments issued under the incentive program are made and are dependent upon the monetary volume of expenditures through the credit instruments, the total interest income on the credit instruments, and the number of instruments issued. The tradename or trademark of the company sponsoring the program can appear on the physical credit instruments and on statements provided to participants. Travel and merchandise awards are integrated with the credit instrument program.

32 Claims, 25 Drawing Sheets

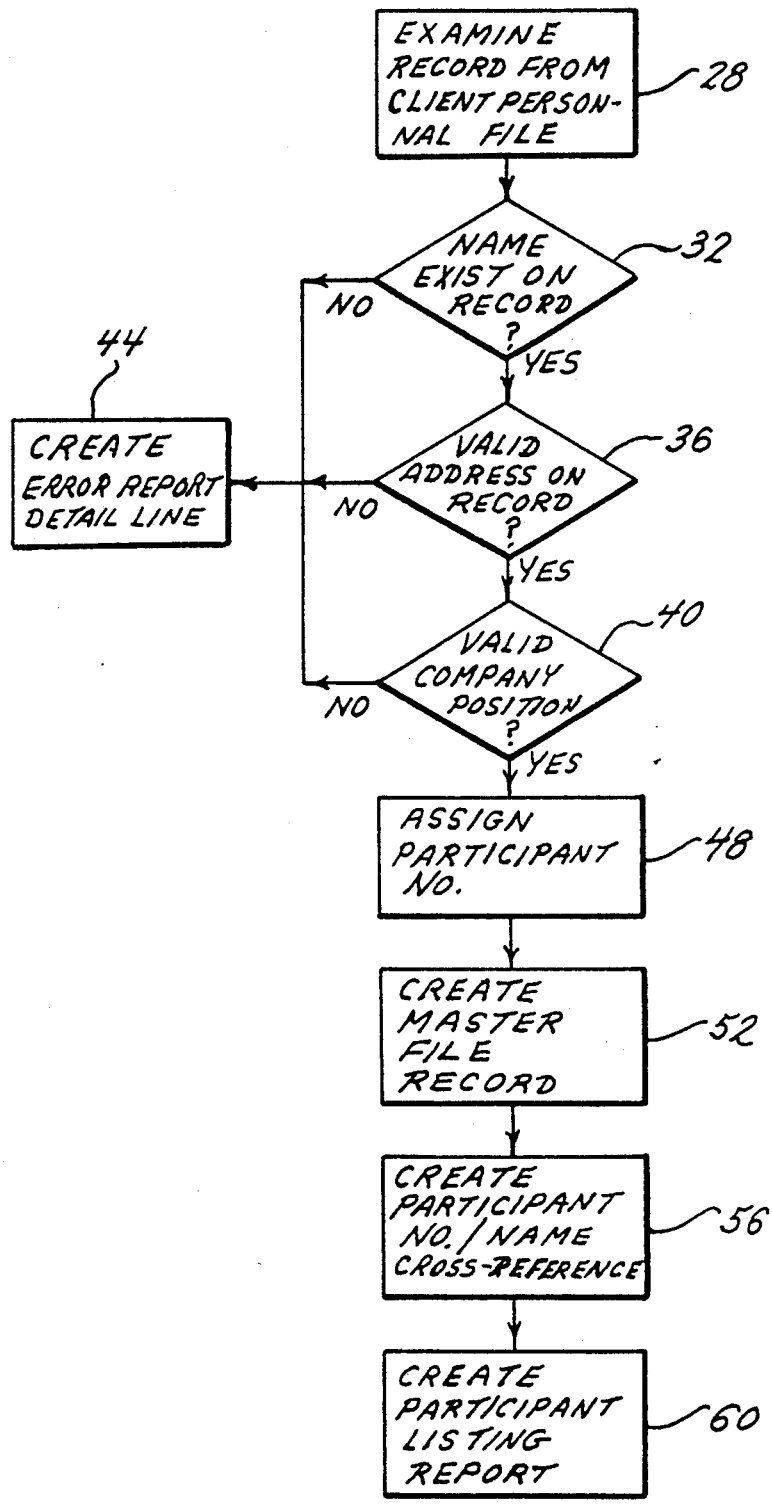
FIG. 1.1

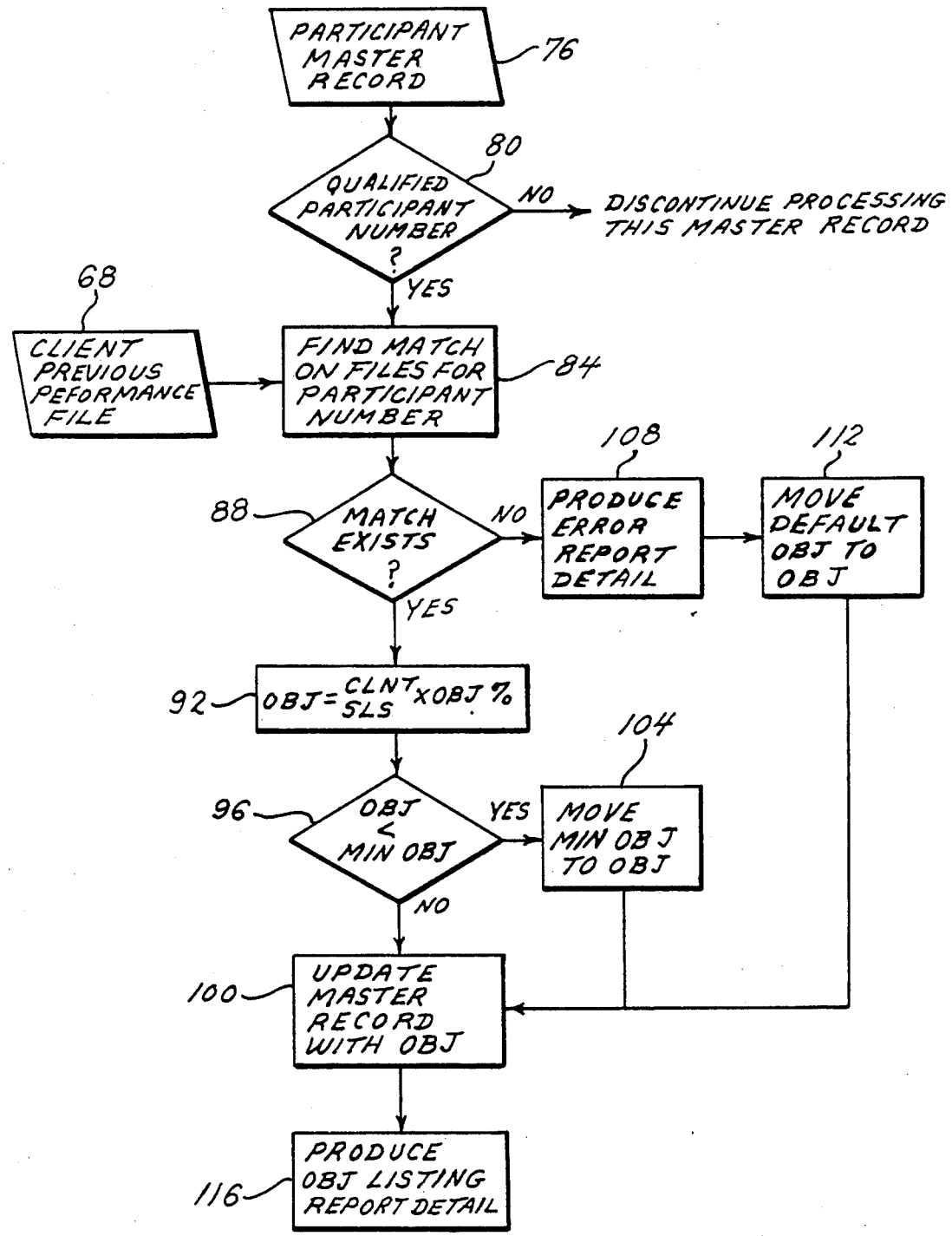
FIG. 1.2

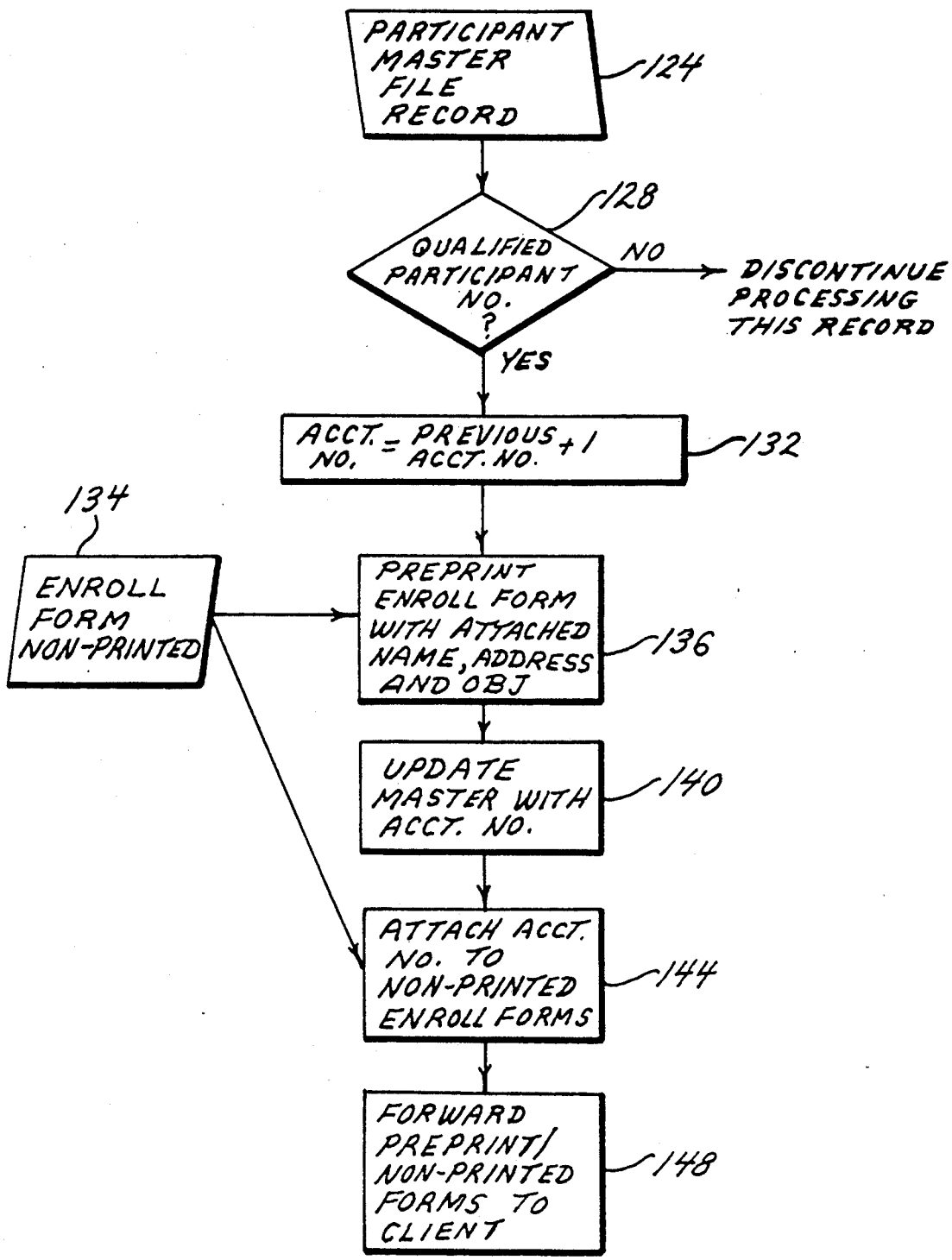
FIG. 1.3

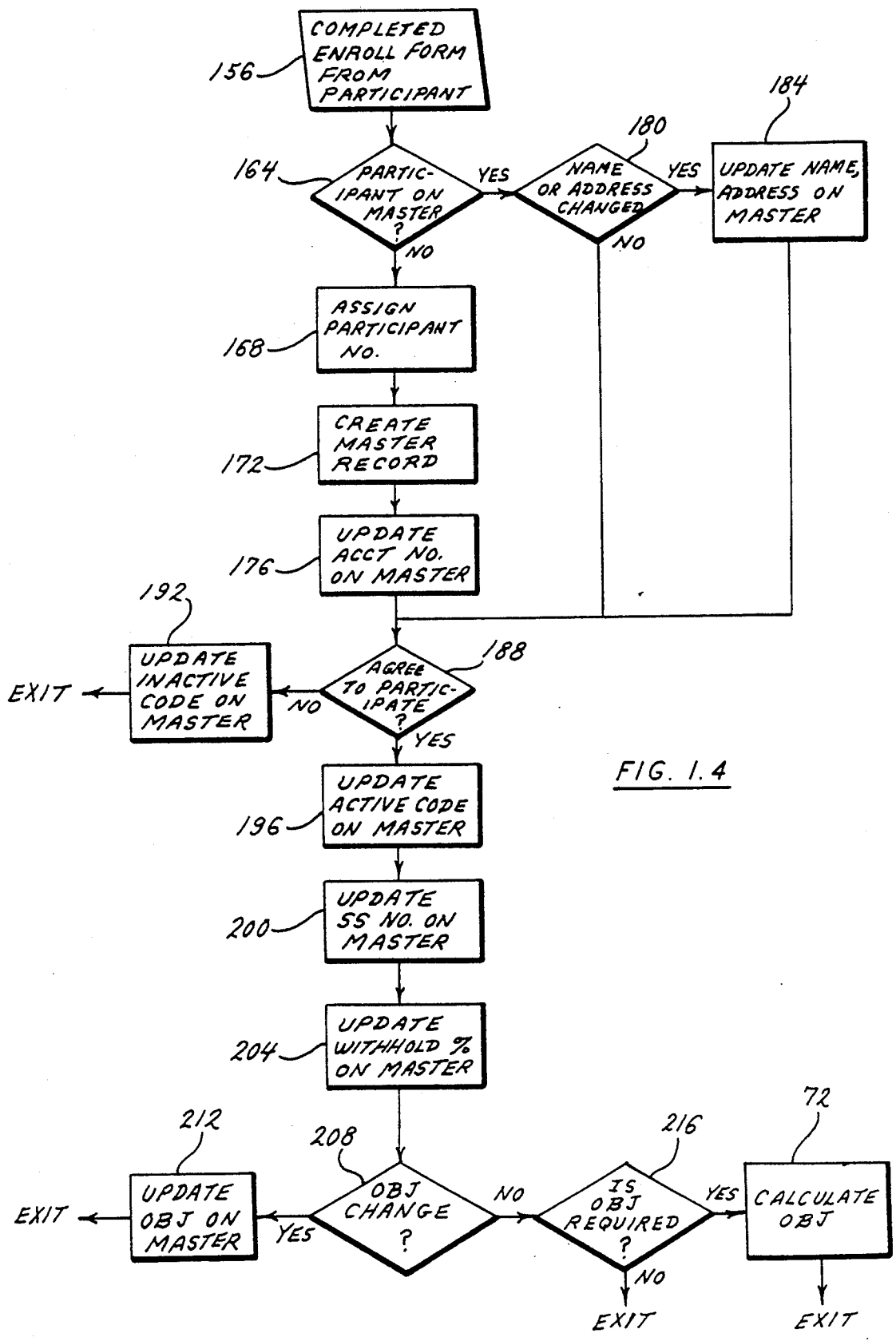
FIG. 1.4

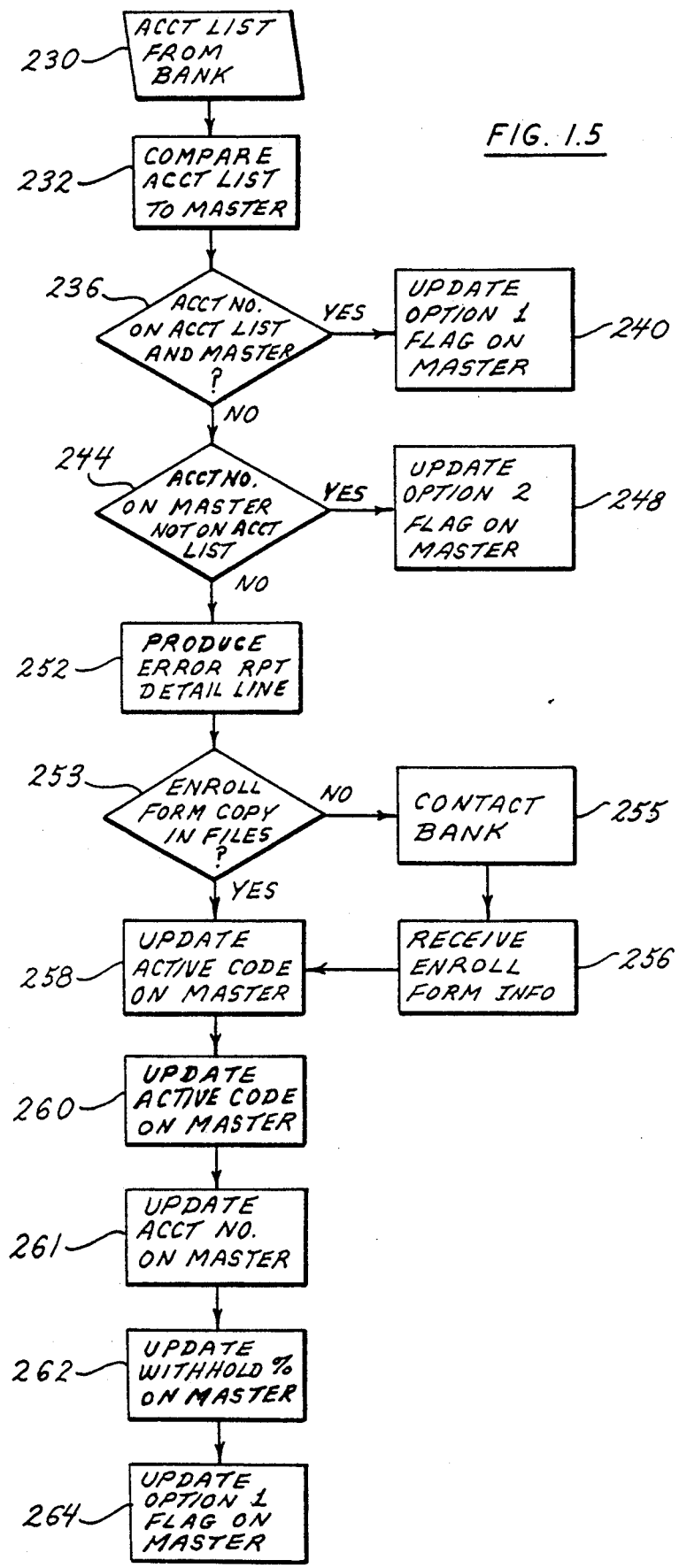
FIG. 1.5

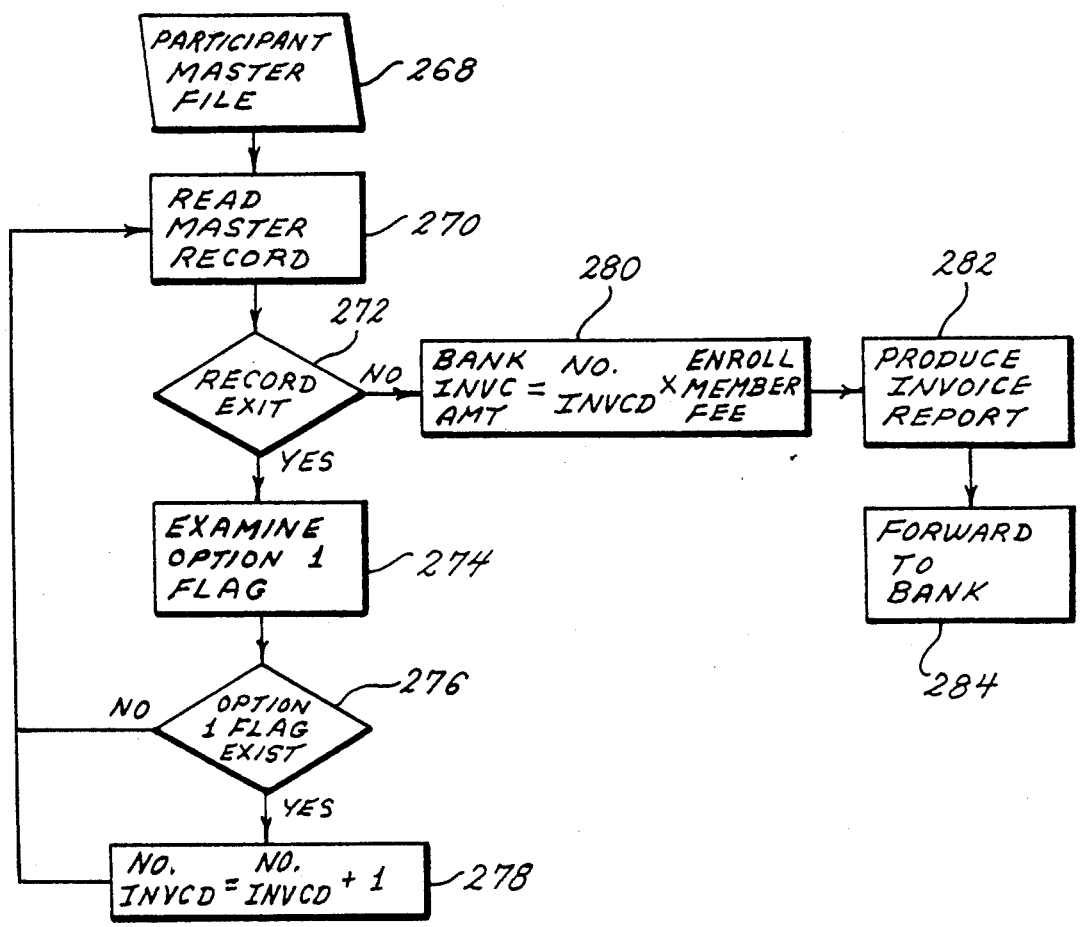
FIG. 1.6

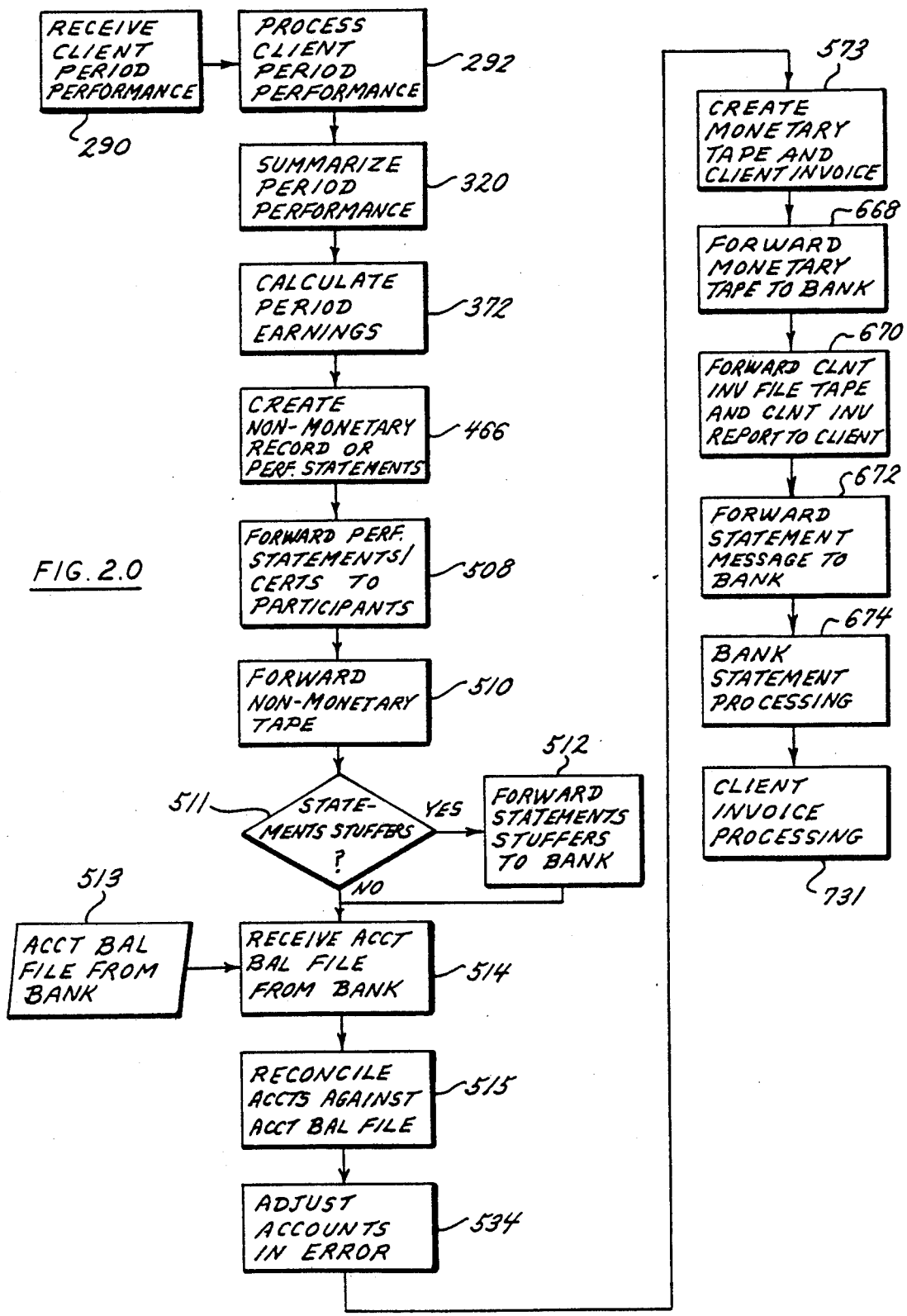
FIG. 2.0

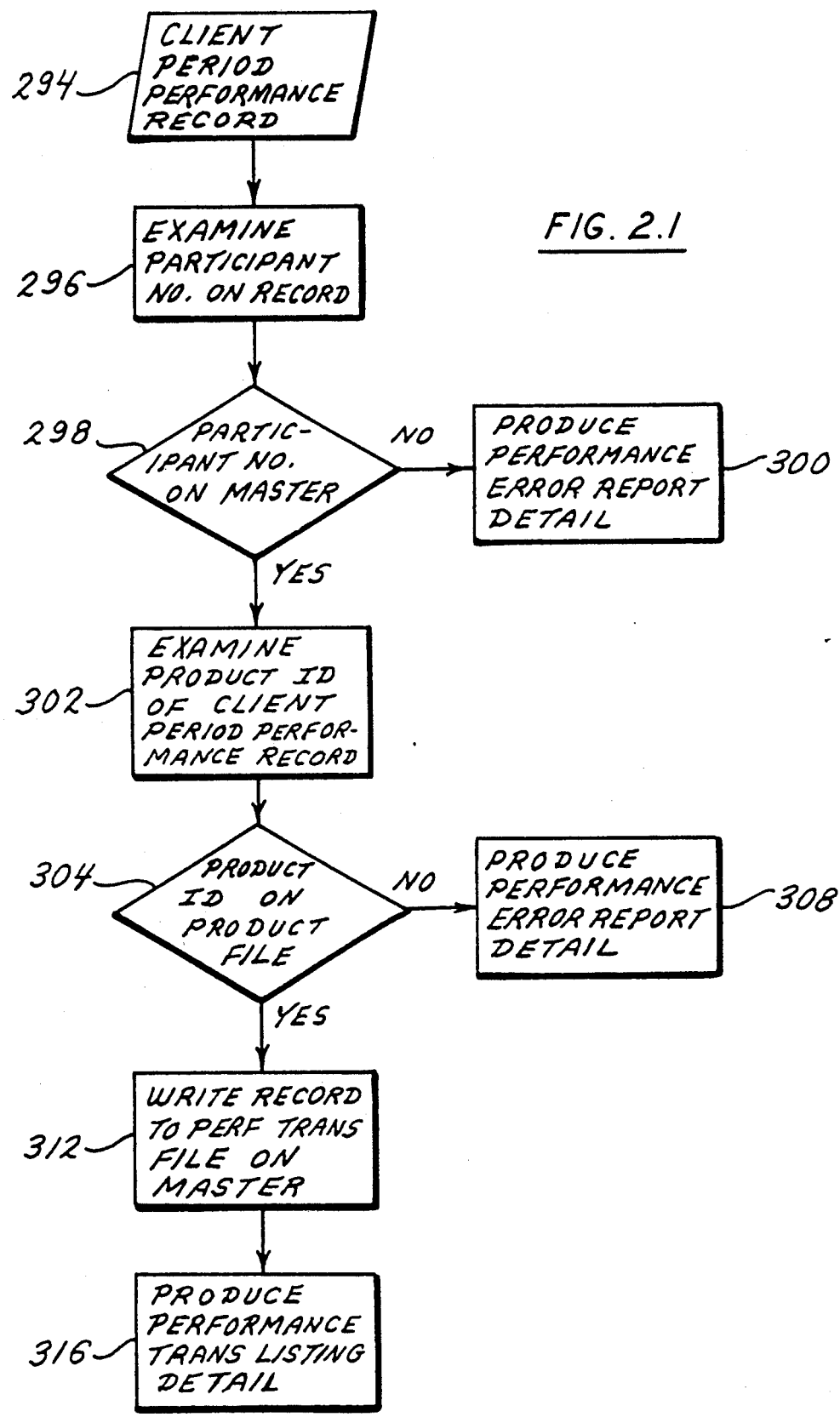
FIG. 2.1

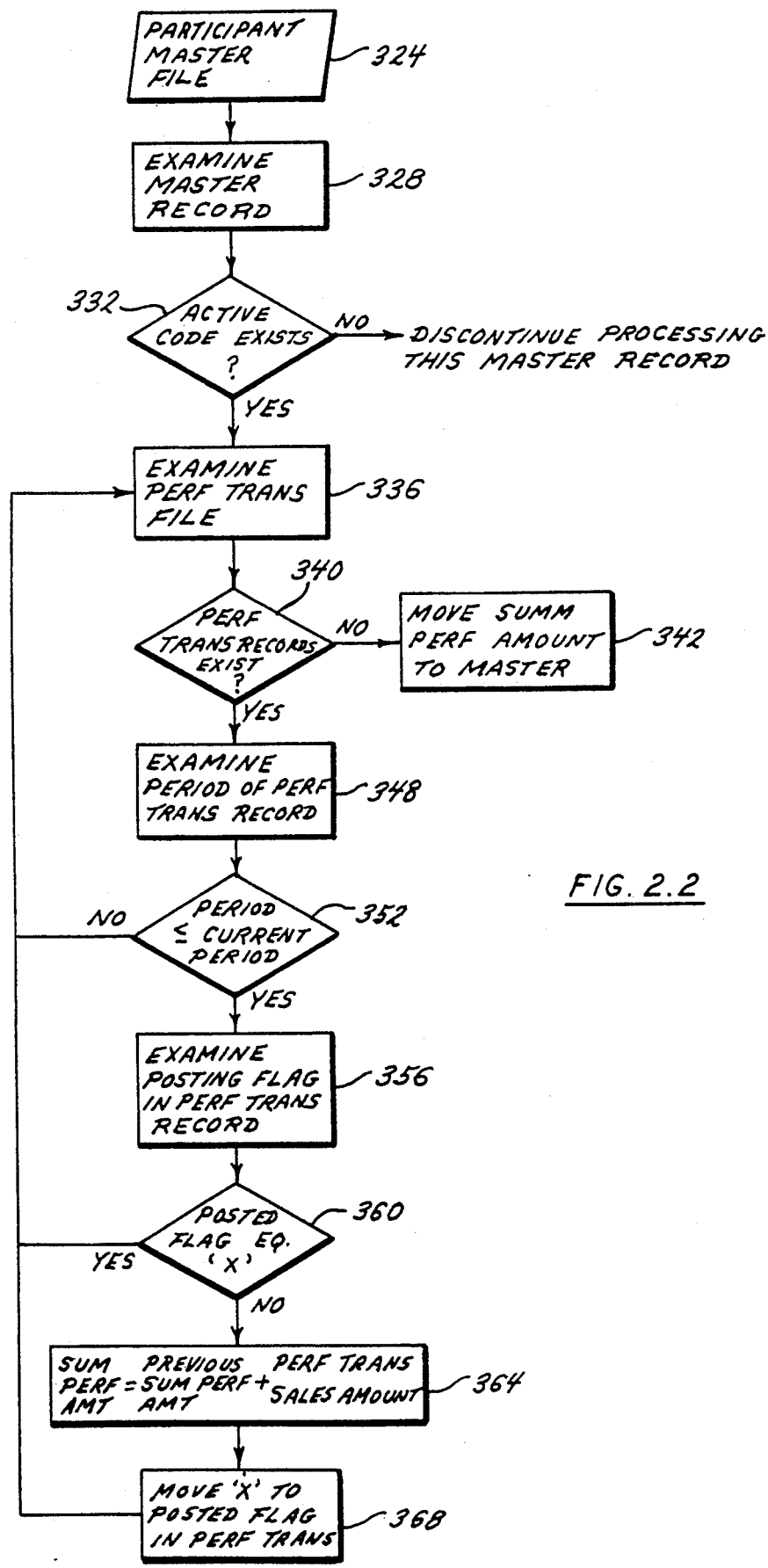
FIG. 2.2

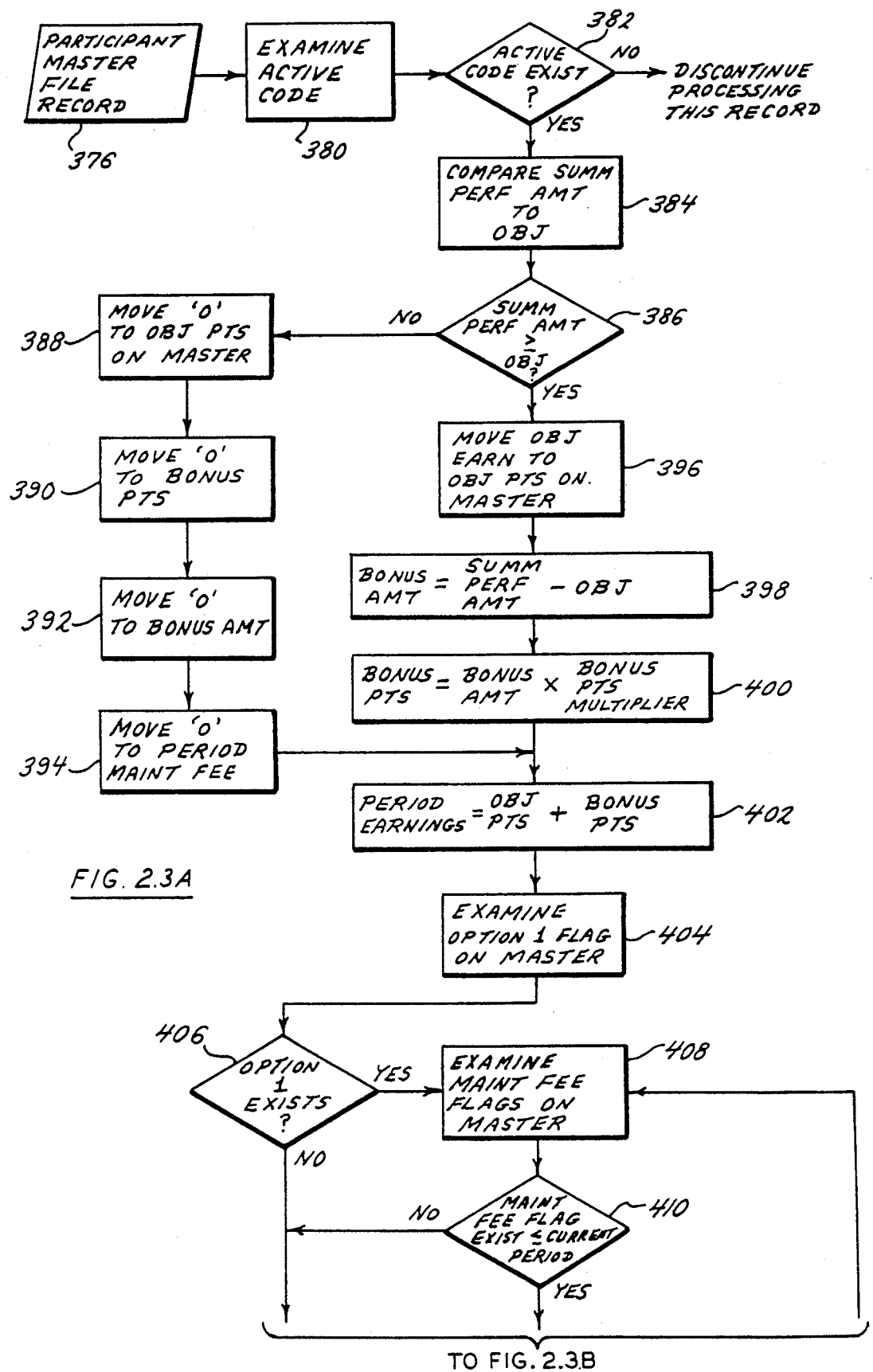
FIG. 2.3A
TO FIG. 2.3B

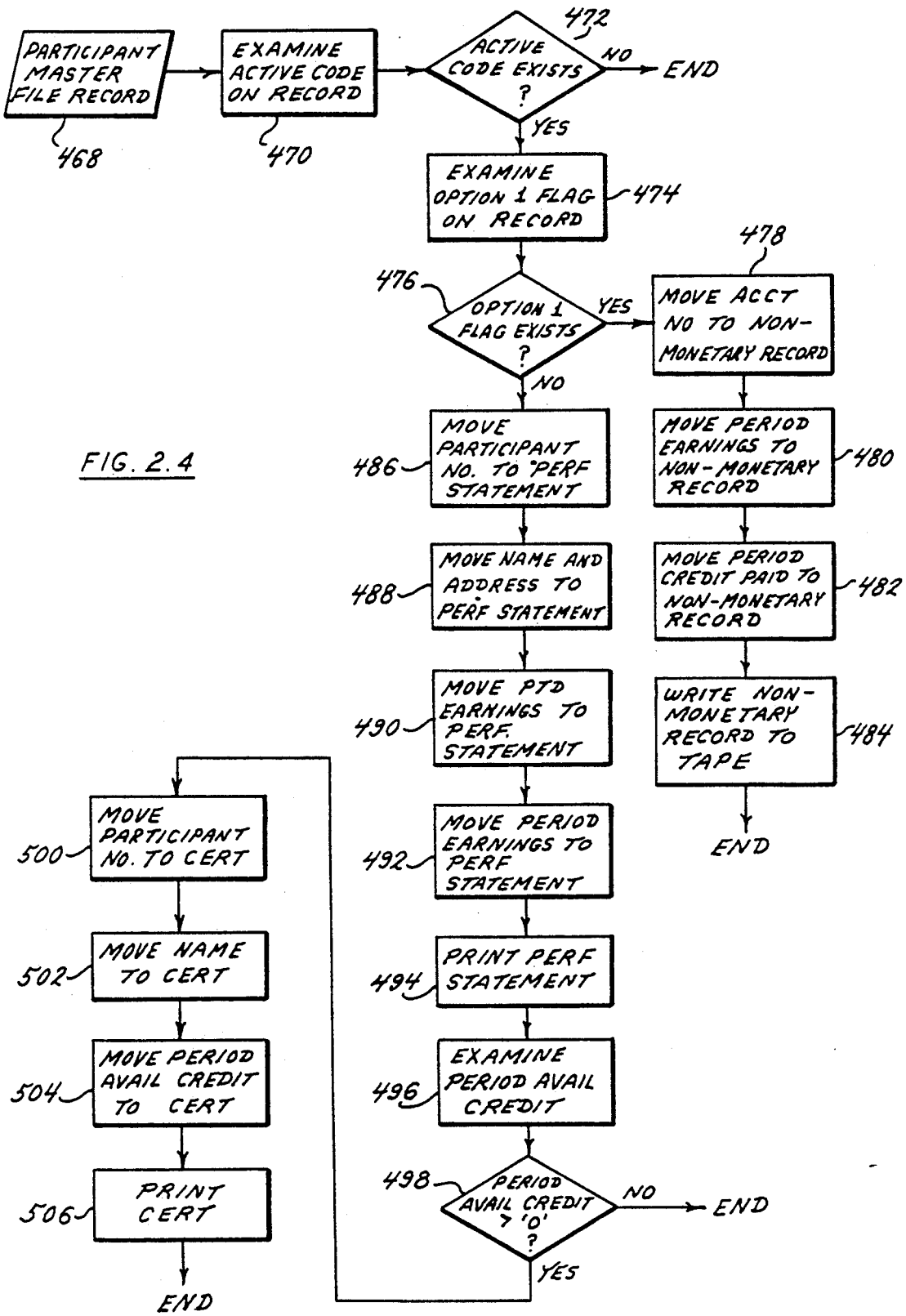
FIG. 2.4

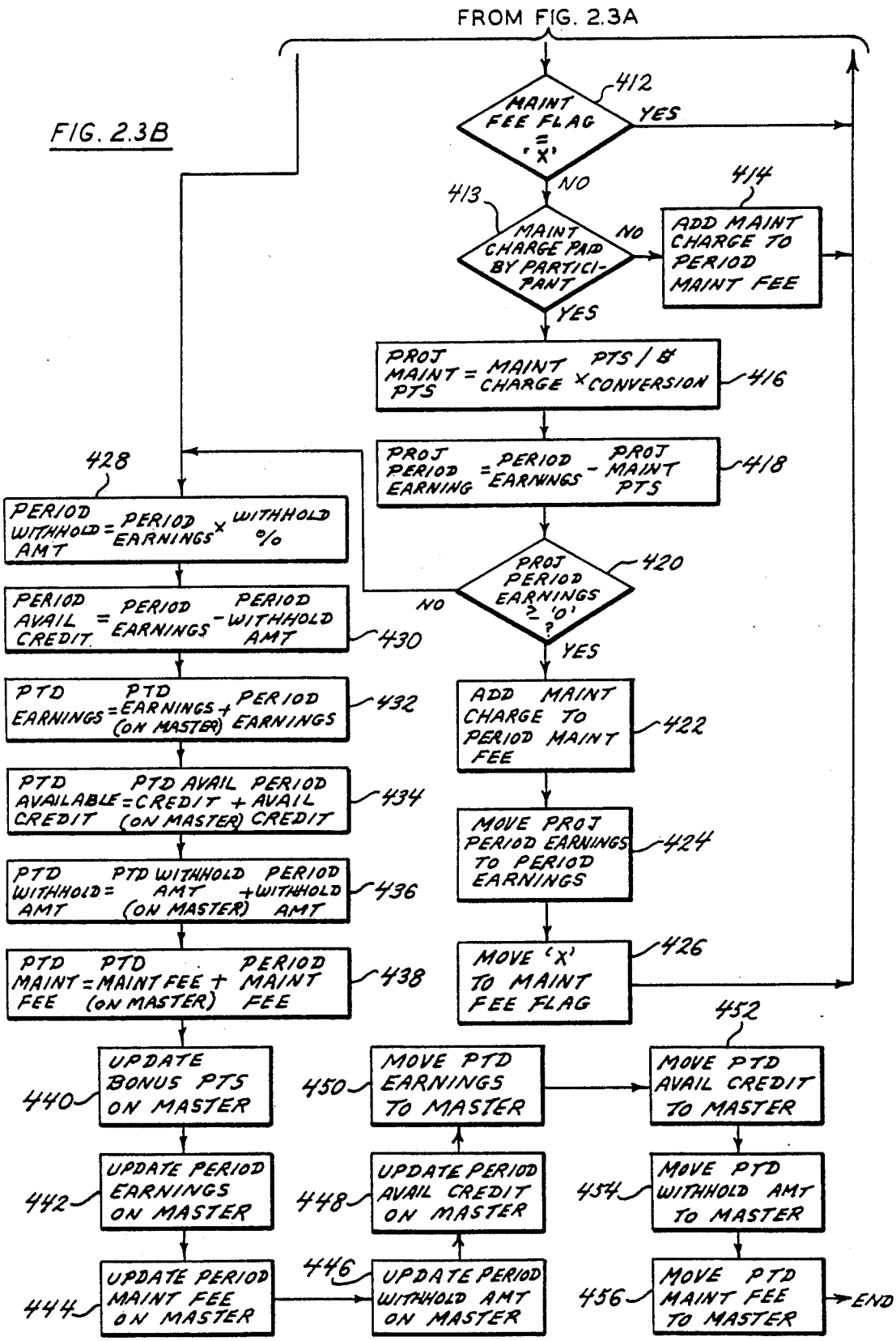
FIG. 2.3B

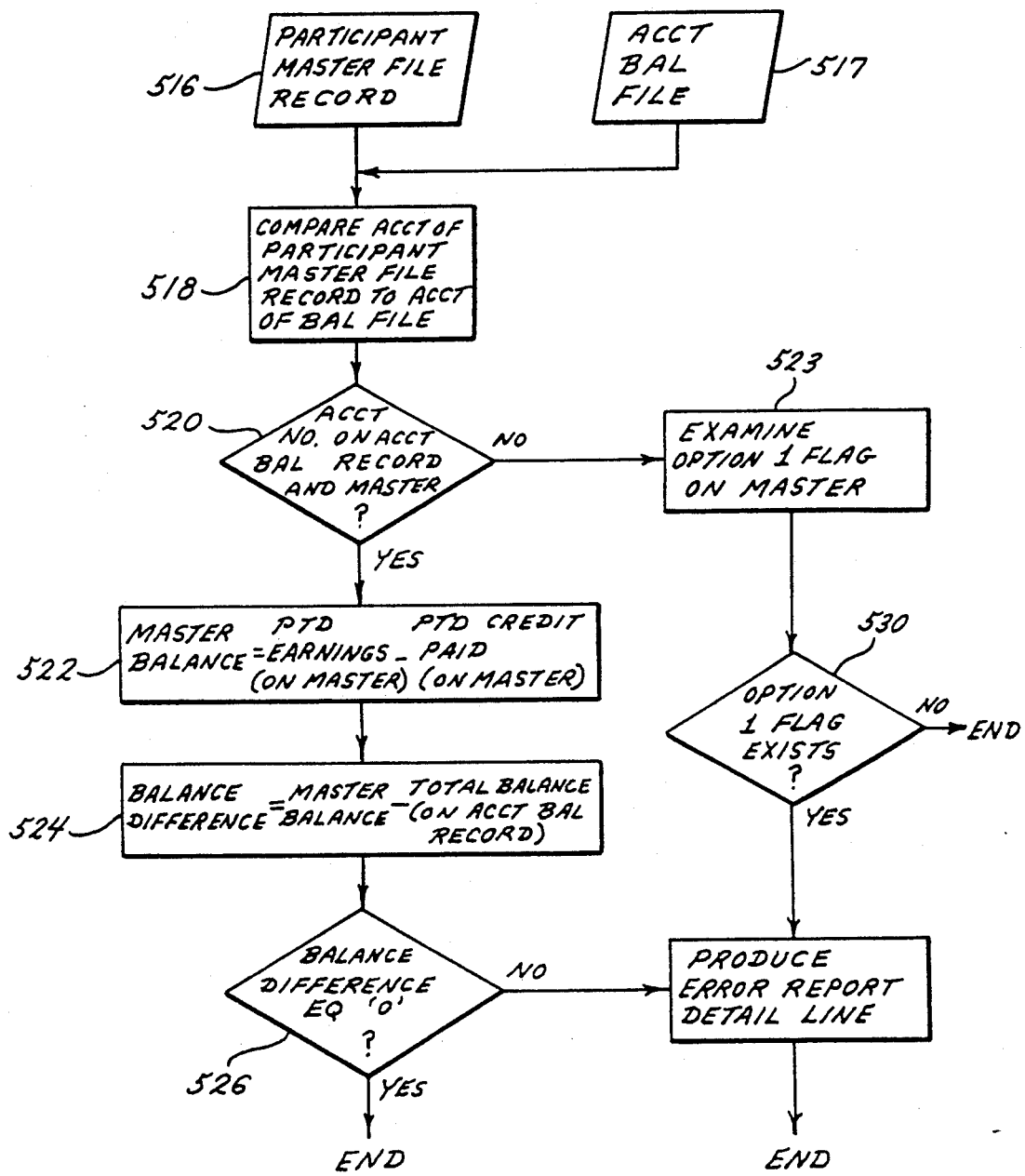

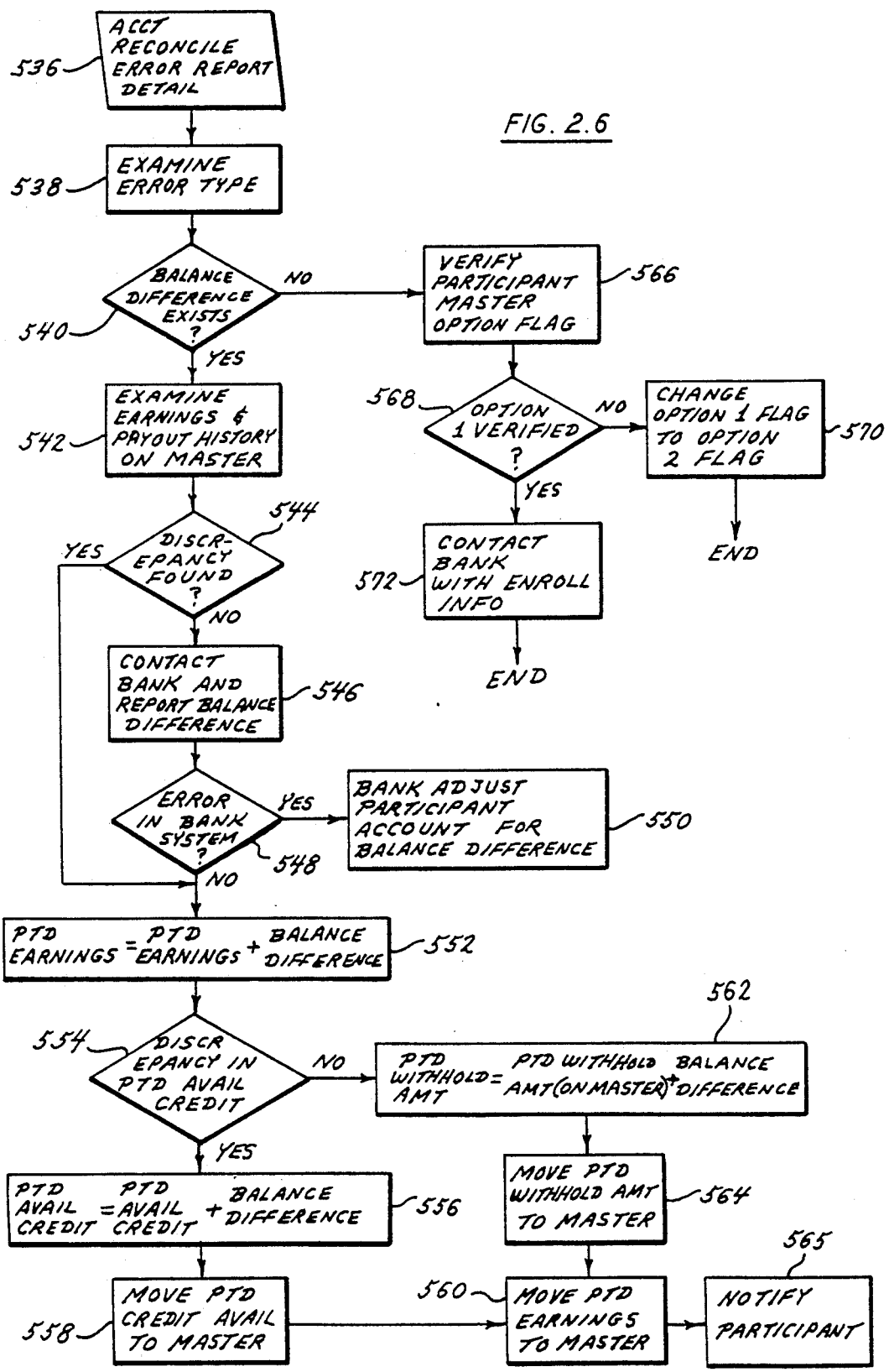
FIG. 2.6

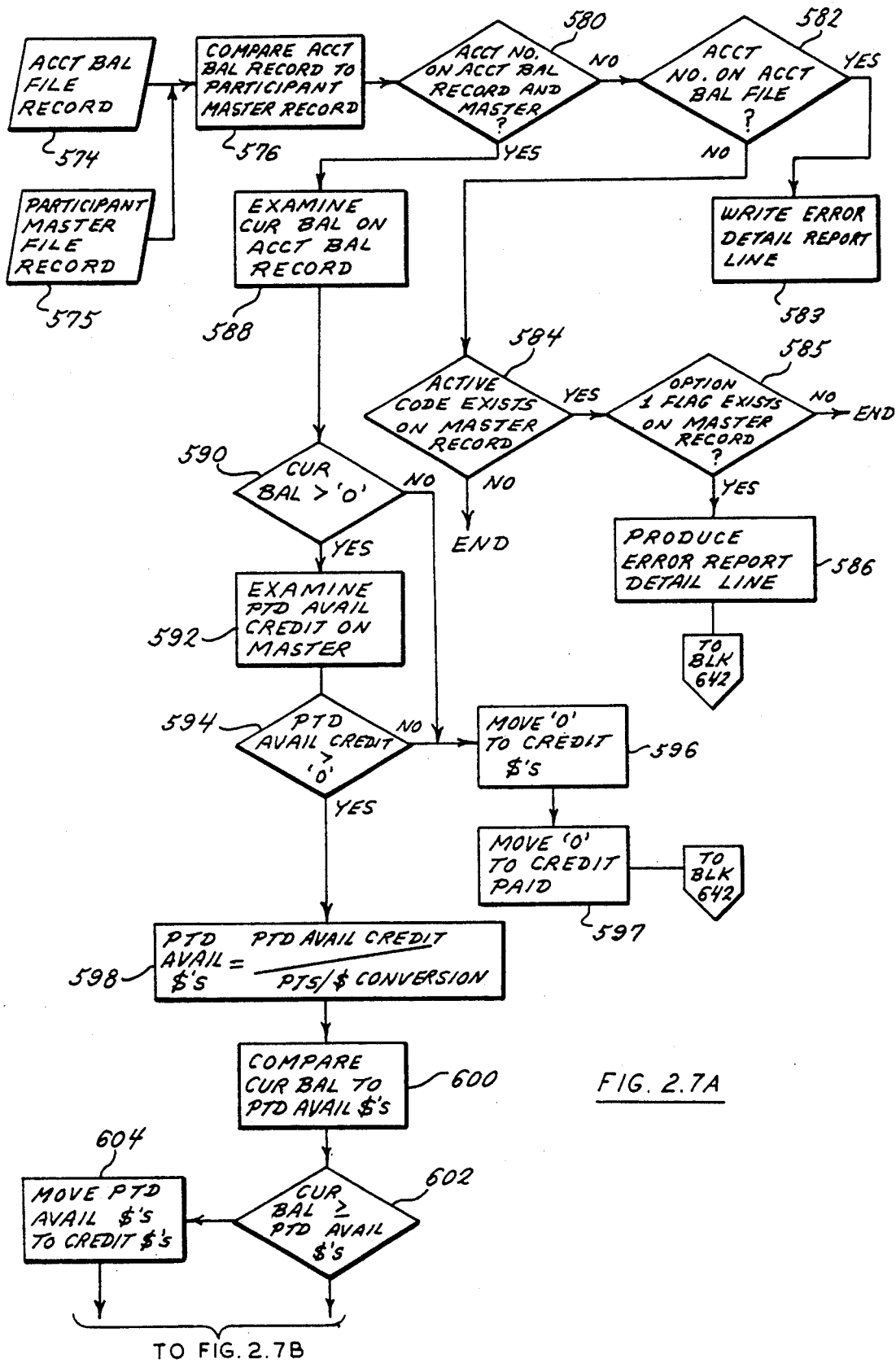
FIG. 2.7A

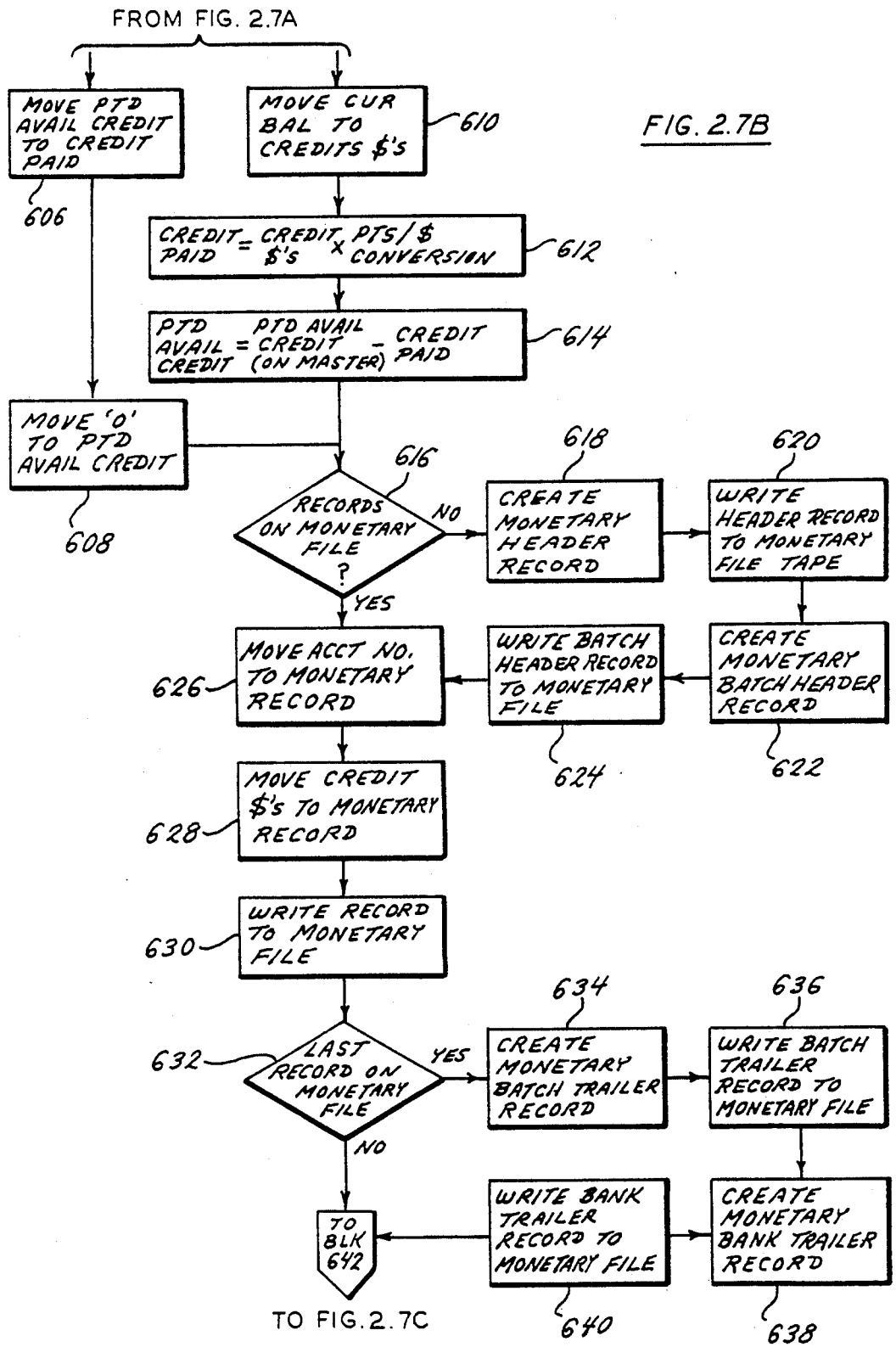
FIG. 2.7B

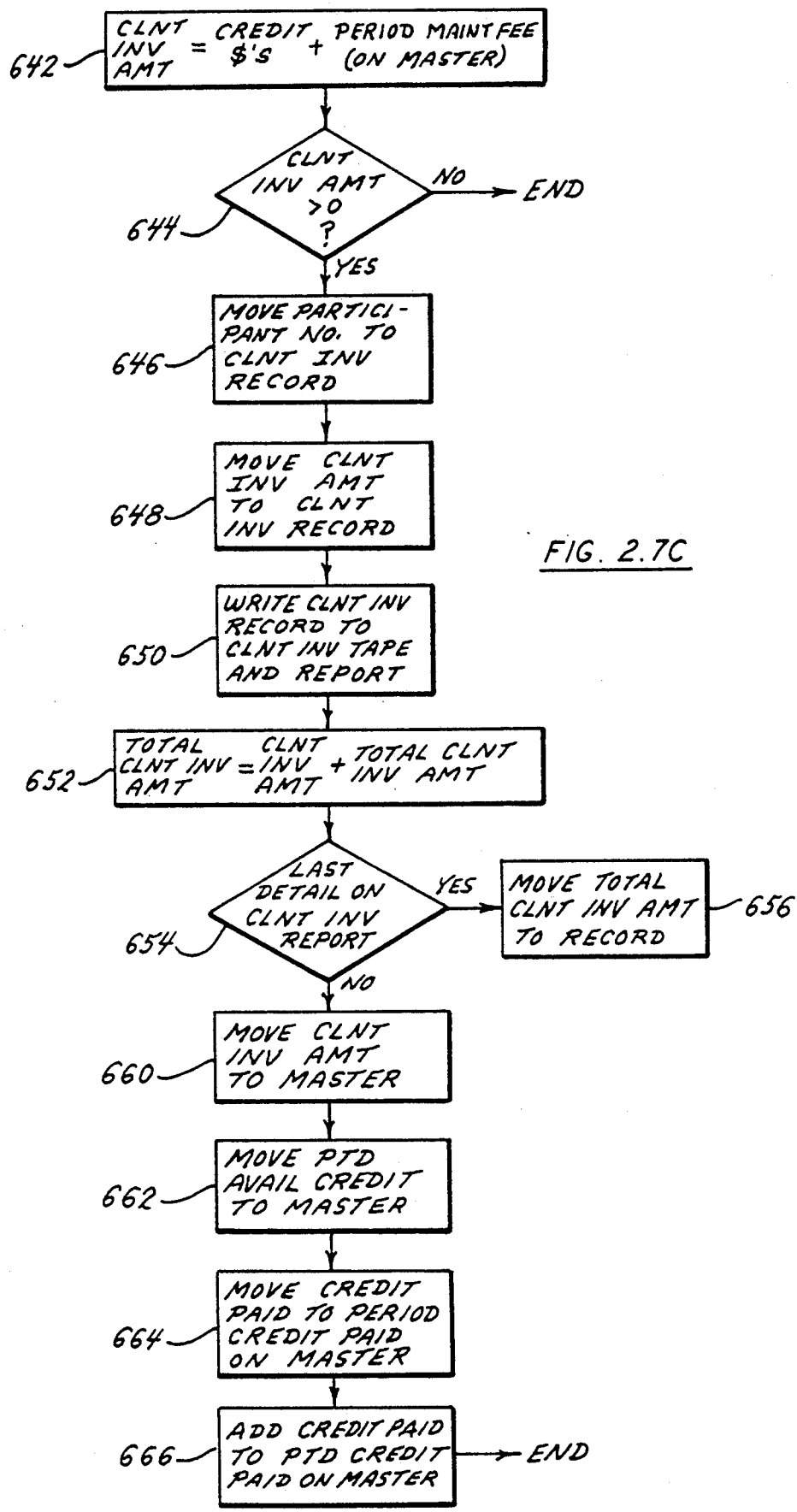
FIG. 2.7C

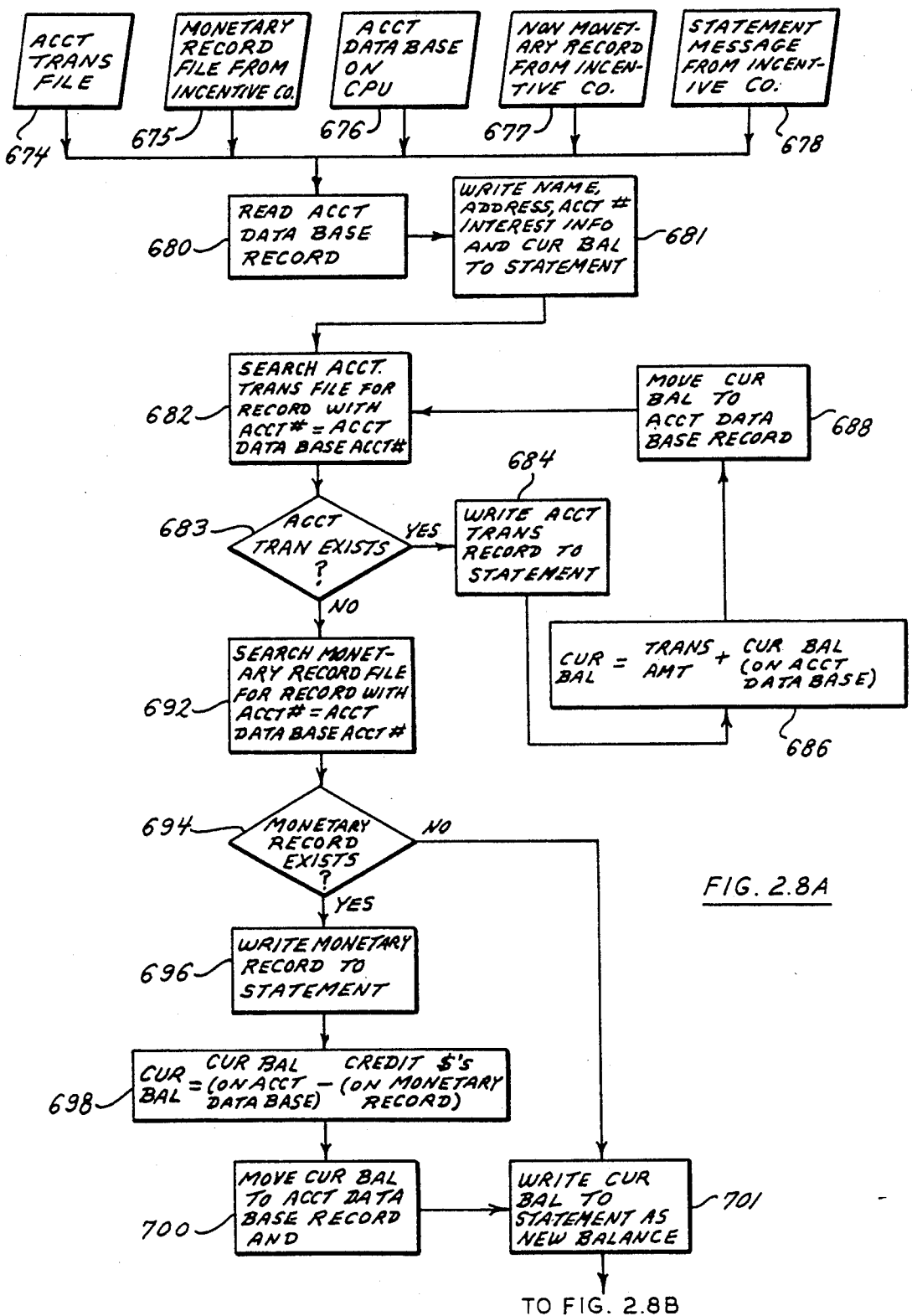
FIG. 2.8A

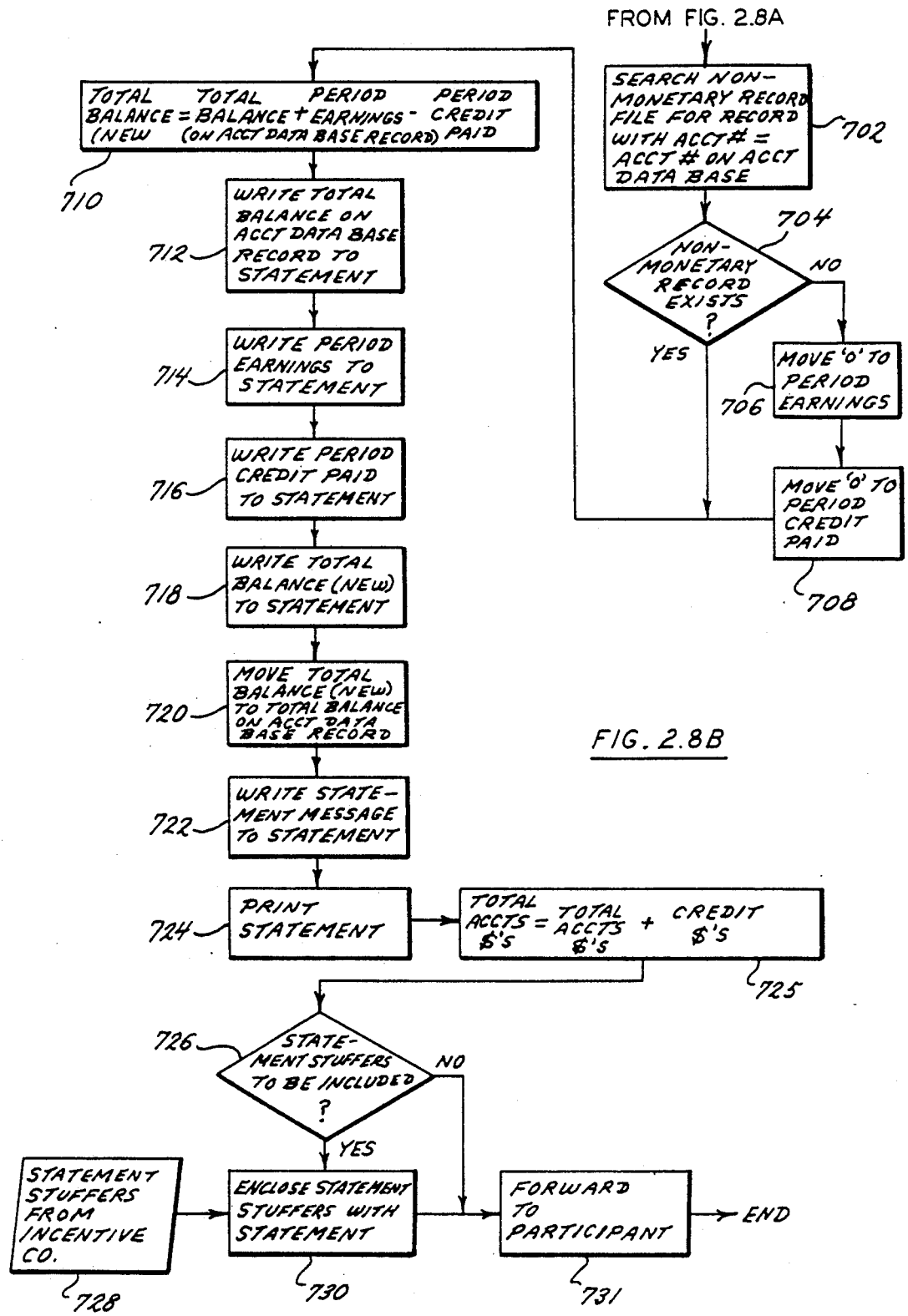
FIG. 2.8B

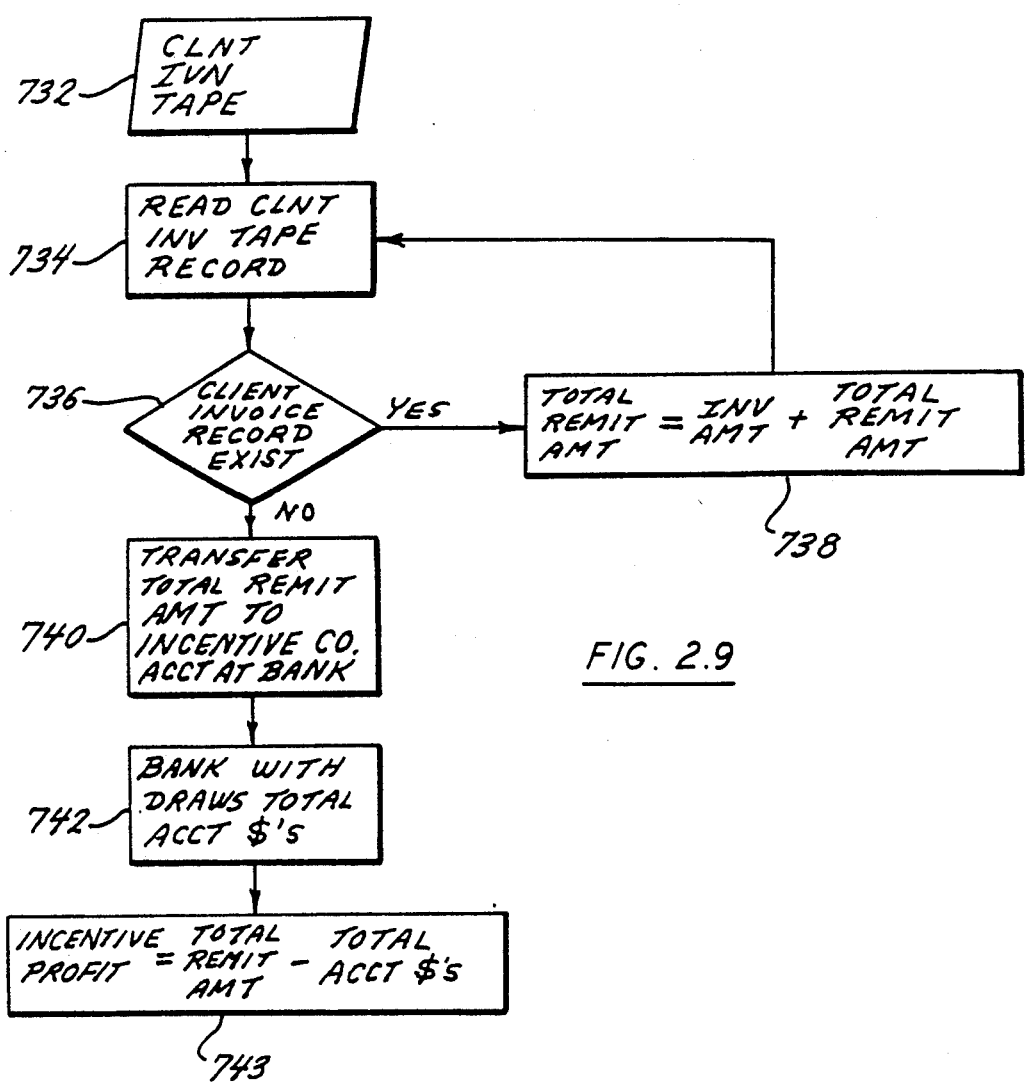
FIG. 2.9
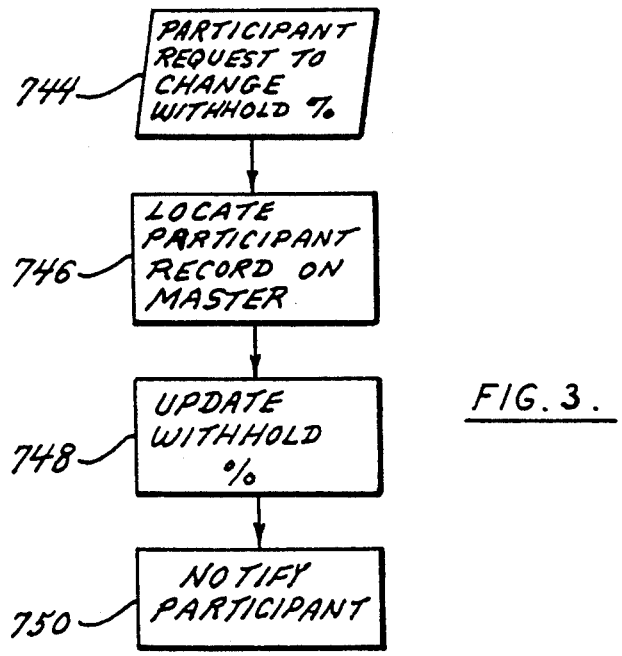
FIG. 3.

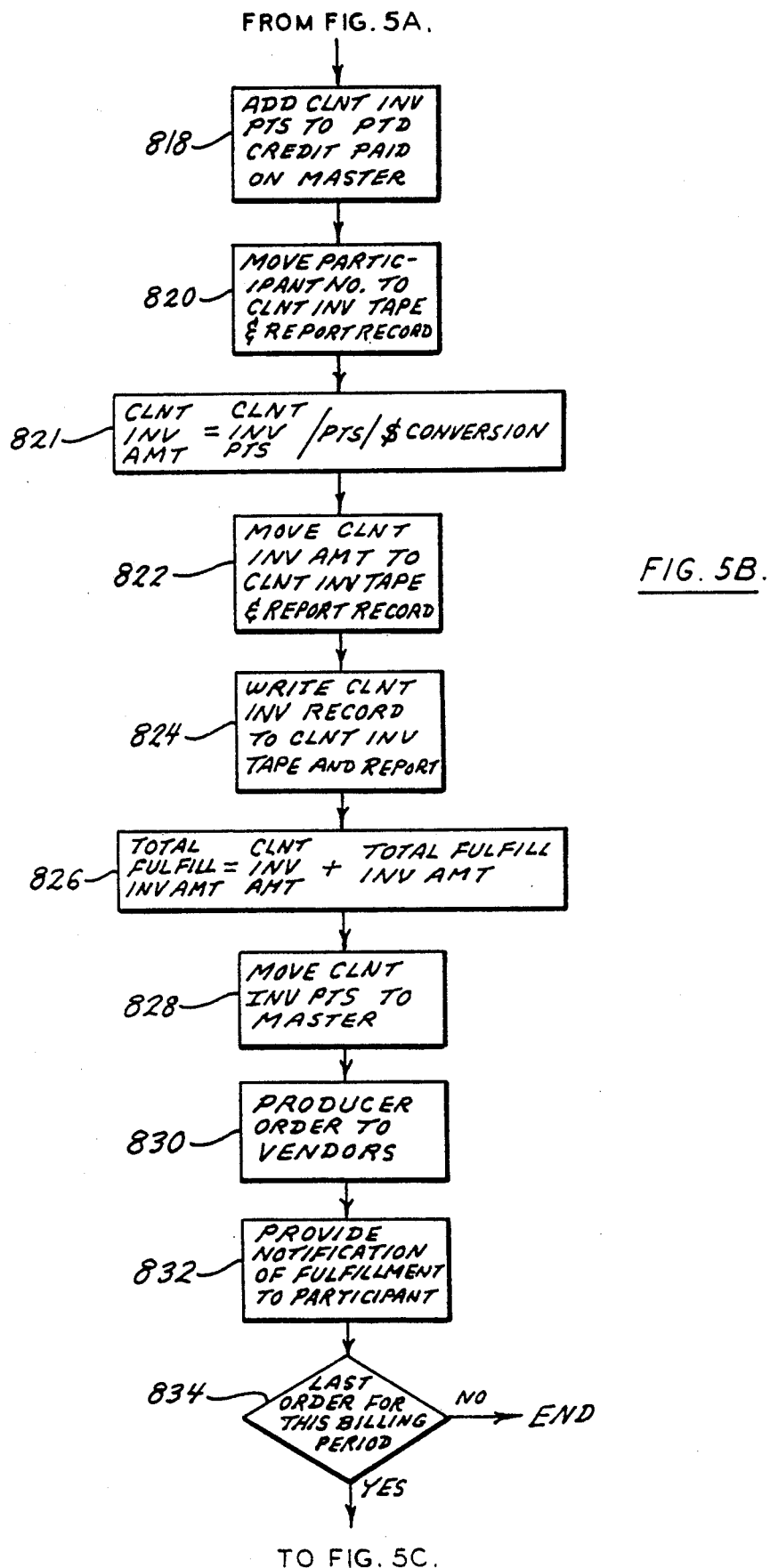

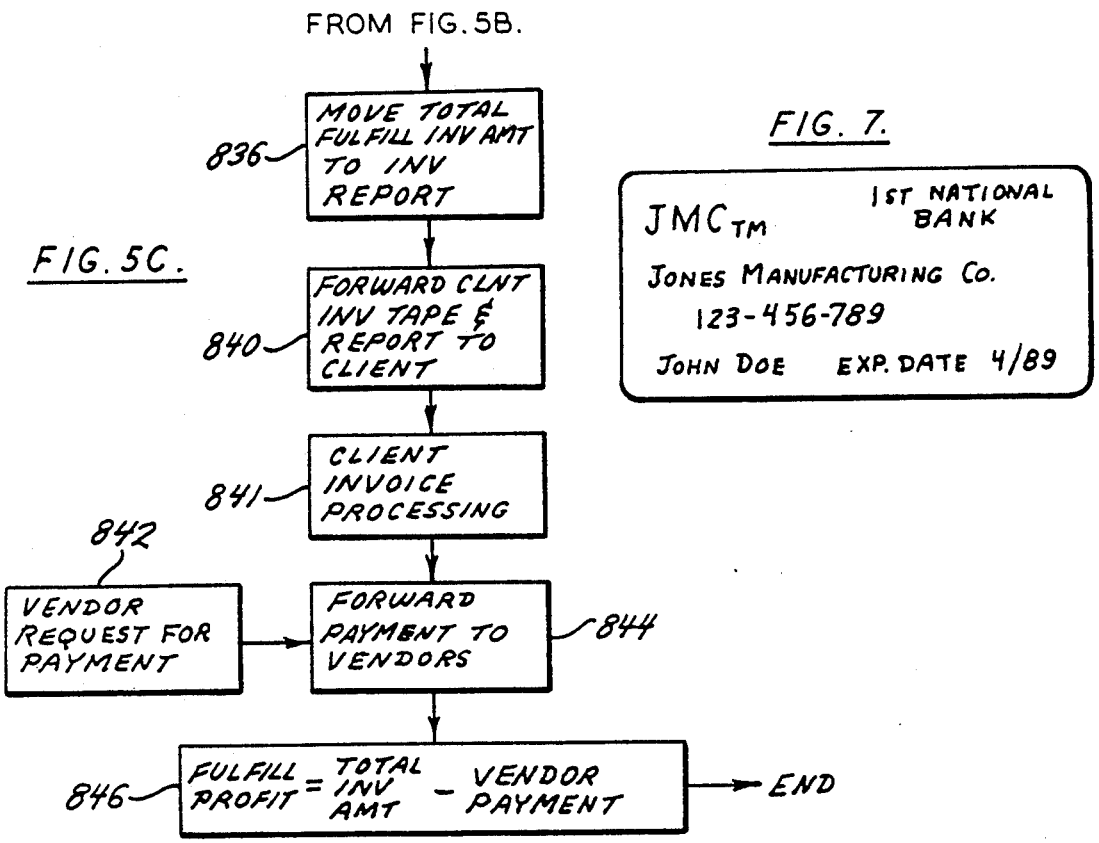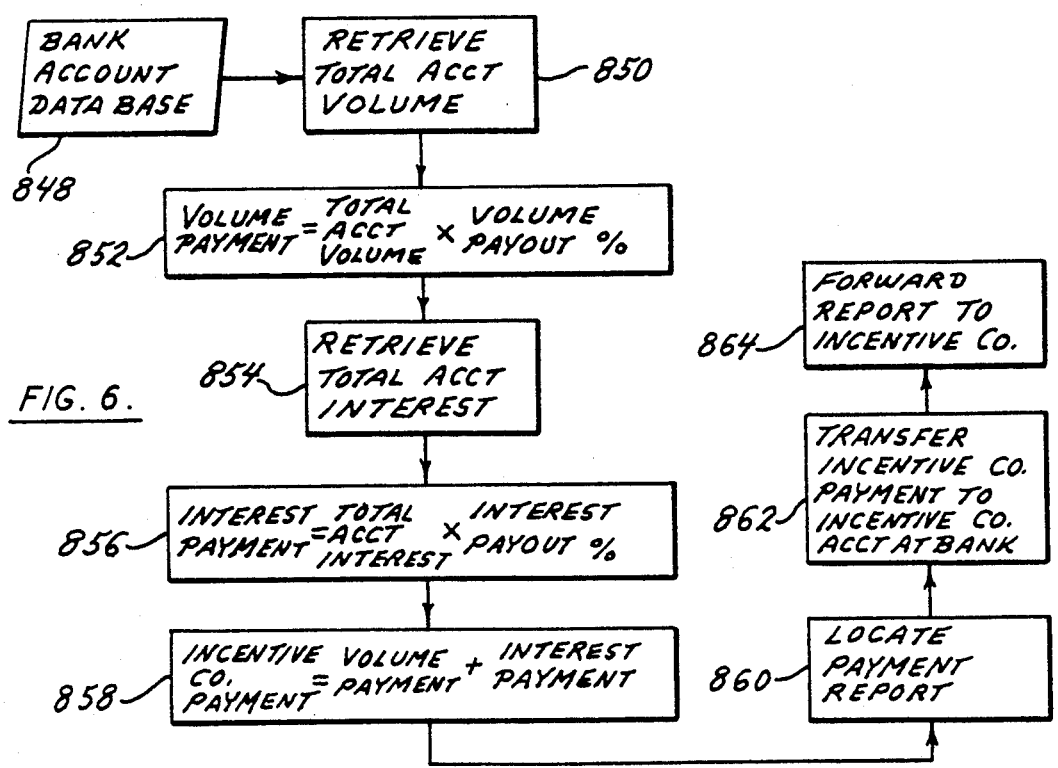

SYSTEM AND METHOD FOR ADMINISTRATION OF INCENTIVE AWARD PROGRAM THROUGH USE OF CREDIT

This is a continuation of co-pending application Ser. No. 098,008 filed on 09/17/86, abandoned.

FIELD OF THE INVENTION

The invention relates to the field of computer programming and data processing systems for incentive award programs Heretofore incentive companies have contracted with a sponsoring company for providing an incentive program to promote the sales of the sponsoring company's products or services, or to improve the performance of the sponsoring companies' personnel The products or services promoted might have been of a specific nature, such as a certain model product, or have been broader, such as a full product line of the sponsor.

The usual participants in such incentive programs comprise the sponsor's employees, the sponsor's customers and their employees, and/or independent contractors for the company's products or services. Rules are established in order for the participants to earn awards under the programs. These rules vary depending upon what the sponsor hopes to achieve. Typically, with such programs, a certain objective or goal is established for each participant. These goals or objectives can vary depending upon the selection of the sponsoring company. The participant's goal may be based on a certain percentage increase over that participant's performance during the previous year, for example. Or the goal may be simply to sell as many units of a certain product as possible, regardless of the previous year's or previous time period's performance.

Usually a certain number of points are awarded to the participant under the rules for the participant's selling a designated dollar volume or quantity of products or services. If the participant accumulates a predesignated number of points during a certain time period, then the participant is enabled to acquire an award. In many cases, the value of the award or awards increases with the number of points accumulated. In the past, such awards have included converting the points earned to a dollar amount according to a formula. The dollars are then used to purchase merchandise shown in the incentive company's catalog, or to earn a paid trip for the participant and perhaps a certain number of family members to a vacation spot such as Hawaii or Florida. In some cases the points are converted to a direct cash payment to the participant at either the culmination of the period or the program.

Such incentive programs have utilized computer programming and data processing to report to the participants the number of points that have been achieved at certain periods during the program, and to advise how many more points the participant needs to qualify for certain merchandise purchases or for the vacation goal.

The incentive programs heretofore known have had a number of drawbacks. There are two kinds of incentive marketing programs that utilize an award of merchandise. In some instances, an incentive company will employ a combination of both kinds in the distribution of merchandise. With one kind, the incentive company has its own warehousing facilities to store the merchandise. The incentive company buys the merchandise from manufacturers or distributors, and stocks its warehouses with the merchandise. The incentive company has catalogs prepared which show the merchandise stocked by the incentive company. If a participant qualifies for an award of merchandise, the participant is limited to the merchandise shown in the catalog. The items of merchandise which can be ordered through the catalog depend on the amount of points achieved by the participant. Hence a participant who has earned more points under the incentive program can order more expensive merchandise, or more items of merchandise, than one having a lesser accumulation of incentive points, within certain limits.

This warehousing has the disadvantage of tying up the incentive company's money in the inventory stockpile. This money is not drawing interest and is not being used while the inventory sits in the warehouse. Incentive companies can overestimate the amount of total achievement of the participants under the various incentive programs it is providing, in which case the amount of merchandise to be ordered is less than expected, resulting in an overstocking of merchandise. This exacerbates the inventory drain since the merchandise sits in the warehouse for even a longer time. In fact, because of such a long duration of being stockpiled, some of the merchandise may have to be sold on the general market in order to become rid of it.

If on the other hand the incentive company underestimates the total performance of participants in its incentive programs, then it may be understocked in the items of merchandise requested. This delays shipment and delivery of the requested merchandise, causing the participant aggravation and dissatisfaction with the sponsor and the incentive company. Moreover, since these later purchases may not be in bulk, or because of price increases, the cost to the incentive company can be escalated above initial costs.

Another problem with such warehousing is that in order to counter problems of excessive inventory and to continually have merchandise readily available, the incentive companies tend to stock many of the same items year after year. The participants become bored with having the same old merchandise choices, or a selection with little variety. Accordingly, participants have little motivation to achieve an award in which they have little interest. Additionally, after the participants acquire a certain number of the merchandise items through prior programs, they have no use for more of the same when the merchandise is again offered later. With such a warehousing system, the incentive company is motivated to buy merchandise in bulk in order to get better cost breaks. Furthermore, in order to better move any one item of merchandise inventory better and to keep track of inventory more easily, the incentive companies are encouraged to limit the number of items available. This also leads to stocking the same old merchandise over long time periods, which results in the participants having the same boring choices over the years and becoming jaded after a certain degree of exposure to the incentive programs.

Other disadvantages are that the incentive company has to properly maintain warehouse conditions, such as temperature and humidity, to preserve the merchandise, as well as take precautions to prevent theft or fire. Accommodations to receive the goods, stack or arrange them, as well as record their location, their entry and departure, are also needed. Some incentive companies have also found it desirable to maintain a number of warehouses throughout the country for better distribution.

Moreover, the warehousing system has problems associated with shipping merchandise by the incentive company to the participant. These include merchandise being damaged in transit, not only causing frustration to the participant, but necessitating the incentive company spending time and effort to package and ship merchandise once again to the participant. The system entails the administrative procedures and additional cost of insuring the merchandise not only during warehousing, but during its shipment.

With the other kind of merchandise system, the incentive company does not have its own warehouses. Rather, it has contracts with suppliers or distributors of products to meet the obligations to participants. With this type of system, there are the aforesaid problems of goods damaged during shipment leading to participant aggravation.

Moreover, because the supplier or distributor is spaced from the participant by an additional layer of communication, there can be further delay in shipment and mistakes caused by miscommunications. Shipment delay can result if the supplier or the distributor is understocked with the requested merchandise. With the supplier or distributor shipping the goods, there is a greater likelihood of there being a mistake in the exact goods that are to be shipped. It is furthermore necessary for the incentive company to maintain the additional relationship with the suppliers in order to properly effect a satisfactory program, which in this respect is a disadvantage as compared to the warehousing system.

With either the warehousing or the supplier merchandise system, the participants frequently pay higher prices than the price for the same merchandise offered by a public retailer and especially by a discount store. This has the unsavory result of the participants believing the dollar values assigned for the purchase points are inflated and illusory.

The incentive programs which award paid trips also have drawbacks. One problem is that there is usually only one vacation spot to select from if the goal is met. In some cases, participants in one geographical area, such as in the eastern half of the U.S., are awarded a trip to a spot in Florida, for example, while those in the western half of the U.S. are awarded a vacation to a different spot such as Hawaii. However, each participant is limited to choosing only one vacation spot. If the participants have been to the same area previously, in many instances they have little or no interest in returning once again. They additionally may have no interest in the vacation spot for whatever reason which may include family limitations, pure lack of interest, or medical problems. There are also the inconveniences of travel arrangements and the psychological stress associated with travelling from a familiar environment to an unfamiliar one. These shortcomings all militate against motivating the participant to achieve.

Finally, some incentive programs have awarded a flat payment of cash to the participants for attaining a certain goal. This type of program has the disadvantage of the award not effectively bringing the sponsor's identity to the participant's attention. Once the cash is paid, there is little to trigger the participant's memory to recall the sponsor's identity.

In contrast, with either merchandise purchases or a vacation trip, the merchandise itself or the participant's memory of the vacation stimulates recollection of the sponsor, thus reinforcing favorable thoughts toward the sponsor.

With incentive programs heretofore, the incentive companies have earned income from the sponsor client through general fees paid by the client to the incentive company.

SUMMARY OF INVENTION

The present invention improves over the prior art. It provides for a new incentive award program using computer processing, programming and printing for assignment and issuance of credit instruments to participants, with monetary amounts awarded to participants for expenditure through the participants' credit instrument accounts depending on the participant's achieving a certain level of performance. The participants can choose to withhold none, part, or all of the monetary amount eligible for allocation toward the credit instrument amount.

The processing and programming can calculate objectives for the participants, and permit the participants to change the amounts withheld and change the objectives. The programming, processing and printing prepares reports to the participants, to the sponsoring company and to the incentive company which can include the amounts allocated for expenditure through the credit instrument accounts based on award achievements, the transactions with the credit instruments, the account balances, the withheld amounts, the performance record, and other information.

Messages printed on the reports themselves and on other documents mailed to participants stimulate and encourage the participants to perform under the incentive program. The credit instruments issued, such as credit cards, can have the sponsoring client's trademark, trade name or other identifying indicia visibly shown thereon to constantly keep the sponsor's products or services in the minds of the participants.

Because with the invention it is not necessary for the incentive company to purchase merchandise for a merchandise award program, or be bothered with vacation planning, the problems associated with such award systems are eliminated. However, the invention provides for integration of an award system using merchandise or vacation awards for those participants unable to qualify for issuance of a credit instrument.

The invention has great appeal to financial institutions, such as banks, that issue credit instruments, since such institutions are constantly searching for ways to issue more credit instruments to qualified individuals. The incentive company is not only freed from the shackles of administering catalog merchandise awards or vacation awards, but receives profit from the incentive program through fees paid by the financial institution which are dependent upon the total monetary volume of the participants' credit instruments transactions, upon the interest income on credit instrument transactions, and upon the number of credit instruments issued. The incentive company also earns profits through payments made by the sponsoring company, or the client, for administration of the incentive award program.

Because credit instruments such as credit cards are widely accepted, not only throughout the U.S. but throughout the world, a tremendous add virtually unlimited degree of flexibility is offered to participants for selection of their own personal award under the incentive program. No longer must the participants be chained to the limited selections of merchandise catalogs or of the familiar vacation trips. As a result, renewed inspiration and motivation to achieve under the new incentive program is generated.

The invention as set forth in one or more of the claims provide one or more of the following objects.

It is an object to provide for data processing and computer programming implementation of a new system for, and method of, using a credit instrument, and an account therefore, integrated with an incentive award program.

Another object is to provide a new incentive award system and method using data processing and computer programming which allocates money for use with a participant's credit instrument based on that participant achieving a certain level of performance.

Yet a further object is to provide for a new system and method for incentive development utilizing computer programming and data processing to store and report the combination of performance information for each participant, the money allocated for use through each participant's credit instrument based on his or her performance level, and information detailing each participant's expenditures with the credit instrument along with the credit instrument account balance.

Moreover an object is to provide a new system and method for an incentive award program effected by data processing and computer programming to allocate account numbers for credit instruments in a consecutive and preselected order corresponding to the order of enrollment of participants with the incentive company that is organizing the program.

Still another object is to provide data processing and computer programming for an incentive award system and method wherein the performance measurement time for participation is divided into periods, and monetary amounts are allocated for use through the participant's credit instrument at the end of each such period based on the participant achieving a certain level of performance at the end of each such period.

An additional object is providing an incentive award system and method using computer programming and data processing which allocates amounts for use by a credit instrument based on performance as aforesaid, and with participants enabled to withhold a selected portion of the allocated amount to save for a special use planned by the participant.

An object is to also provide an incentive award program effected by data processing and computer programming integrated with a credit instrument account whereby each participant with the aforesaid credit instrument account receives a statement reporting on the participant's performance under the incentive program and encouraging the participant to continue to achieve results for which a level of performance has been set.

It is furthermore an object to provide an incentive award system and method utilizing the computer programming and data processing integrated with amounts allocated for expenditure through a credit instrument account, in combination with a sponsoring company setting achievement levels for participants in order to have money allocated to the credit instrument account, with the sponsoring company, companies or consortium identified on the credit instrument, and with identification of the sponsoring company on reports of performance and money allocation to the participant's credit instrument account in order to frequently focus the participant's attention on the sponsoring company.

It is as well an object to provide an incentive award system and method using computer programming and data processing integrated with credit instrument accounts for the participants whereby an incentive company receives payment from the financial institution issuing the credit instruments to the participants based on the volume of purchases made with those credit instruments, and/or based on the volume of interest income the financial institution earns on the balances for the participant's credit instrument accounts, and/or based on the total number of credit instruments issued y the financial institution to participants enrolled in the incentive program.

It is furthermore an object of the invention to eliminate difficulties caused by incentive award programs used heretofore. It is an object to eliminate the warehousing of merchandise and the problems associated with acquiring such merchandise and shipping it to participants.

Another object is to eliminate the problems associated with buying merchandise from suppliers or manufacturers who ship the merchandise to participants. It is furthermore an object to provide an incentive award program that eliminates or minimizes problems associated with incentive programs which award vacation trips to participants.

Moreover, an object is to provide an incentive award program which has a high degree of flexibility in permitting participants to choose and select the type of award they desire.

It is an object to provide for an incentive award program that allows for ease in administration by the incentive award company and by the sponsoring company.

Yet another objective is to provide for such a program which is attractive to financial institutions who desire to issue credit instruments and is attractive to potential participants desirous of having a credit instrument account with that institution.

It is a further object of the invention to provide data processing and computer programming to integrate use of the credit instrument incentive program in combination with the alternatives of merchandise selection or travel tour selection for those unable to participate in the credit instrument facet of the program, and for those who want to withhold an amount for vacation or merchandise selection for some reason.

It is an object to provide for an incentive award system and method which brings the attention of the participants to the sponsoring company and the sponsor's products or services to be promoted.

These and other objects and advantages will become apparent from the following description of the invention.

DESCRIPTION OF THE DRAWINGS

FIG. 1.1 is a schematic of the system and method which branches from FIG. 1, showing the addition of client personnel to the master;

FIG. 1.2 is a schematic which branches from FIG. 1 and concerns the system and method for calculating objectives for participants under the incentive program rules;

FIG. 1.3 is a schematic which branches from FIG. 1 and concerns the production of participant enrollment forms;

FIG. 1.4 is a schematic which branches from FIG. 1 and shows the processing of completed enrollment forms;

FIG. 1.5 is a schematic which branches from FIG. 1 and shows the processing of the account list;

FIG. 1.6 is a schematic branching from FIG. 1 and showing the invoicing of the financial institution for payment to the incentive company for an amount for each credit instrument issued;

FIG. 2.0 is a schematic of the system and method showing the processing of information for time periods in which the incentive program may be divided;

FIG. 2.1 is a schematic of the system and method which branches from FIG. 2, showing the processing of the client's performance file;

FIG. 2.2 is a schematic which branches from FIG. 2 and shows the summarization of the participant's performance during a time period in which the incentive program may be divided;

FIG. 2.3 is a schematic comprising FIG. 2.3A and FIG. 2.3B, showing the calculation of period earnings under the incentive program. FIG. 2.3A branches from FIG. 2, and FIG. 2.3B is a continuation from FIG. 2.3A;

FIG. 2.4 is a schematic which branches from FIG. 2, showing the production of the non-monetary tape;

FIG. 2.5 is a schematic which branches from FIG. 2, showing the reconciliation of account balances;

FIG. 2.6 is a schematic which branches from FIG. 2, showing the adjustment of errors in accounts;

FIG. 2.7 is a schematic which comprises FIGS. 2.7A, 2.7B and 2.7C, showing the creation of the monetary tape and client invoice tape. FIG. 2.7A branches from FIG. 2, FIG. 2.7B is a continuation from 2.7A, and FIG. 2.7C is a continuation from FIG. 2.7B;

FIG. 2.8 is a schematic which comprises FIGS. 2.8A and 2.8B, showing the processing of the statement at the financial institution, FIG. 2.8A branches from FIG. 2 and FIG. 2.8B is a continuation of FIG. 2.8A;

FIG. 2.9 is a schematic which branches from FIG. 2 which shows the client invoice processing;

FIG. 3 is a schematic of the system and method showing the changing of the participant withholding percent;

FIG. 6 is a schematic of the system and method showing the bank payment to the incentive company; and FIG. 7 is an illustration of a type of credit instrument, i.e., a credit card, showing the issuing financial institution as 1st National Bank, an account number, the sponsoring company, Jones Manufacturing Company, and its trademark.

DESCRIPTION OF A PREFERRED EMBODIMENT

Figure 1:
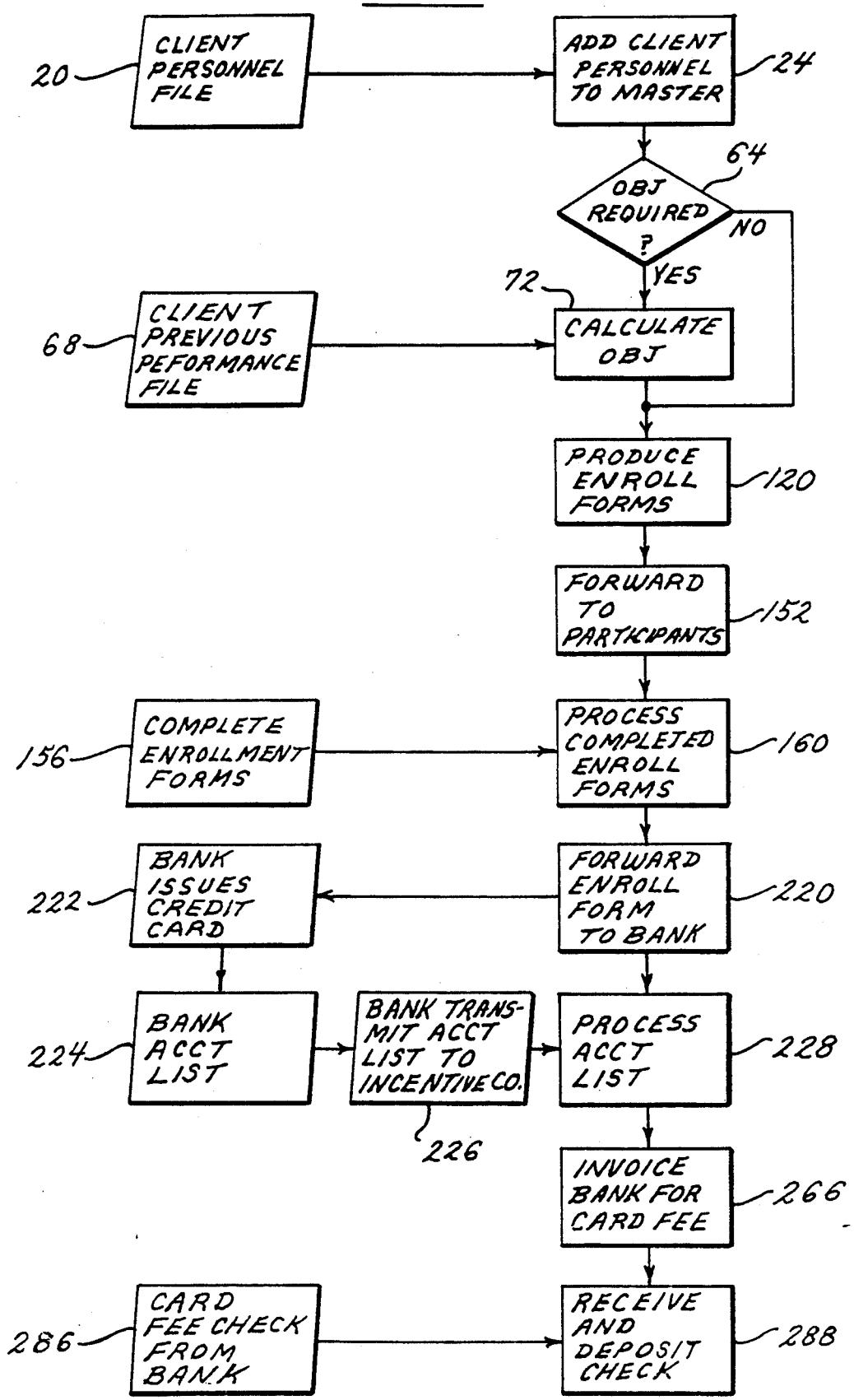
FIG. 1 is a schematic showing the computer programming and data processing for the invention covering the initial program set up and the administration of the program through the use of the credit instrument.

The following terms and definitions are used in the flow charts and in the description of the preferred embodiment to follow:

ACCT BAL FILE—A computer generated file created by the Bank that contains credit instrument period information.

ACCT DATABASE—Computer database which resides on the Bank's central processing unit that contains credit instrument account information records.

ACCT LIST—A computer generated list that contains those ACCT NO.s that have had credit instruments issued to them.

ACCT TRANS FILE—Computer file that resides on the Bank's CPU which consists of transactions that were incurred on the credit instrument account during the previous processing period.

ACCT. NO.—This is the account number assigned to the participant's credit instrument. It is referenced in all correspondence and all transfers of information to the Bank.

ACTIVE CODE—A computer generated code on the participant master file record that denotes the participant's agreement to participate in the incentive program.

BANK INVCD AMT—Total dollar amount that the Bank is to pay the Incentive Company for providing new credit instrument accounts.

BONUS AMT—The period performance amount above objective for a participant.

BONUS PTS—The amount of award points that a participant earned for a period by performing above the assigned objective.

BONUS PTS MULTIPLIER—A value that is determined by the incentive program rules and signifies the amount of period award points earned by a participant for each incremental unit of performance above the period objective.

CERTS—Paper certificates representing period earnings distributed to participants in lieu of credits to their account.

CLNT INV AMT—Dollar amount for a participant that is billed to the client in order that payment may be received by the Incentive Company.

CLNT INV PTS—Award point amount for a participant that is charged to the client by the Incentive Company.

CLNT INV REPORT—Computer generated report that contains participant invoice details and totals.

CLNT INV TAPE—Magnetic computer tape that contains participant invoice records.

CLNT SLS—A tangible measure of performance on which objectives are established.

CREDIT $'s—Period credit dollar amount that is transferred to the Bank to downgrade a participant's credit instrument account.

CREDIT PAID—Calculated credit award points amount that is converted to CREDIT $'s and used to update PERIOD CREDIT PAID.

CREDIT REMAIN $'s—CREDIT REMAIN converted to positive dollars to determine whether money enclosed with the order is substantial enough to cover ORDER AMT.

CREDIT REMAIN—Total award point earnings remaining in a participant's file after FULFILL AMT has been downgraded by ORDER AMT.

CUR BAL—Amount of debt a participant has incurred on his credit instrument account.

DEFAULT OBJ—This is a value assigned to a participant for an objective when prior sales history does not exist for that participant.

ENROLL FORMS—A paper form distributed to participants to gather and verify information regarding the incentive program and credit approval.

ENROLL MEMBER FEE—A dollar amount that the Bank will pay the Incentive Company for each credit instrument the Bank estabished through the Incentive Company.

FULFILL AMT—Total award point earnings a participant has available to purchase travel or merchandise from the Incentive Company.

FULFILL PROFIT—Dollar amount realized by Incentive Company from the difference of VENDOR PAYMENT from TOTAL FULFILL AMT.

INACTIVE CODE—A computer generated code on the participant master file record that denotes the participant has declined to participate.

INCENTIVE CO. PAYMENT—Total dollar amount that the Bank remits to Incentive Company consisting of VOLUME PAYMENT and INTEREST PAYMENT.

INCENTIVE CO. PROFIT—Total dollars received from client less the amount withdrawn by the Bank during period processing.

INTEREST PAYMENT—Actual dollar amount that the Bank will remit to Incentive Company for TOTAL ACCOUNT INTEREST.

INTEREST PAYOUT %—Predetermined percentage that Bank will remit to Incentive Company for each dollar of TOTAL ACCOUNT INTEREST.

MAINT CHARGE—A dollar value charge to the client for a specified number of periods for maintaining a participant credit instrument account by the Incentive Company.

MASTER BALANCE—A summarization of all award earnings that participants have been issued during the incentive program.

MIN OBJ—This is the minimum performance that a participant is expected to achieve during the incentive program.

MONETARY TAPE—Tape that will be sent to Bank to downgrade the participant's credit instrument outstanding current balance.

NO INVCD—Total credit instrument accounts for which the Bank will be charged a fee.

NON-MONETARY TAPE—Tape that is forwarded to the Bank comprising total award point earnings for this period and total award point earnings that were paid on account balance for the prior period.

OBJ %—This is a multiplier to determine the objective for the incentive program's participants. It usually reflects the percentage increase in performance that the client expects to see this period over the same period last year.

OBJ—This is the program objective that is assigned for each participant in an incentive program. This is usually calculated as a percentage over the same period in the last year's actual performance—or may simply be based on zero level performance (any incremental increase earns points).

OBJ EARN—A fixed amount of program points established by the incentive program rules that will be awarded to a participant for meeting his period objectives.

OBJ PTS—Program points that are awarded a participant for meeting his period objective.

OPTION 2 FLAG—A computer code assigned to the participant signifying that the participant has an inactive credit instrument account and the participant's award earnings are to be distributed in traditional incentive program manners.

OPTION 1 FLAG—A computer code assigned to the participant signifying that the participant has a credit instrument account and the participant's award earnings may be applied to this account.

ORDER AMT—The award point earnings necessary to pay for a travel or merchandise award.

PARTICIPANT MASTER FILE—A tape or disk file that resides on the INCENTIVE CO.'s CPU that contains records for each participant.

PARTICIPANT NUMBER—A unique identifier established for a participant so that information from the client may be applied to the correct participant.

PERF STATEMENT—A form generated by computer printing that contains a participant's period and program to date award point earnings that is prepared for those participants who have not been issued a credit instrument.

PERF TRANS SALES AMT—The performance value of a participant performance transaction that has been received from the client.

PERIOD AVAIL CREDIT—Amount of period award point earnings that is available to downgrade debt incurred on the participant's credit instrument account.

PERIOD CREDIT PAID—Amount of award point earnings withdrawn from program to date available credit to pay for debt incurred on the participant's credit instrument account for the period.

PERIOD EARNINGS—Amount of award point earnings a participant has accrued for a given period of the incentive program.

PERIOD MAINT FEE—The actual dollar amount charged to a client by deducting MAINT CHARGE(S) from period earnings when calculating points earnings for a participant.

PERIOD MAINT FEE FLAG—Computer generated flags on the participant master file record that denote that the participant's period maintenance fee has been charged to the client for a respective period.

PERIOD WITHHOLD AMOUNT—Amount of the period award point earnings that has been held aside and is not available to downgrade debt incurred on the participant's credit instrument account, or disbursed by award credit certificate issuance.

PRODUCT ID—Unique number assigned to a client product to reference this product in reporting performance information to the Incentive Company.

PROJ MAINT PTS—Projected period maintenance fee converted to award points to determine if enough period points have been earned to cover the fee.

PROJ PERIOD EARNINGS—Projected period award point earnings used to determine if a great enough amount of period award earnings have been reached to deduct period maintenance fee.

PTD AVAIL $'s—PTD AVAIL CREDIT converted from award points to actual dollar value.

PTD AVAIL CREDIT—Amount of program to date award point earnings that is available to downgrade debt incurred on the participant's credit instrument account.

PTD CREDIT PAID—Amount withdrawn from program to date available credit to pay for debt incurred on the participant's credit instrument account for the entire incentive program up to the current date.

PTD EARNINGS—Program to date earnings. Amount of award point earnings the participant has accrued for the program up to the present date.

PTD MAINT FEE—Maintenance fees accrued for a participant up to the current date.

PTD WITHHOLD AMOUNT—Amount of program to date award point earnings that has been held aside and is not available to downgrade debt incurred on the participant's credit instrument account, or disbursed by award credit certificate issuance.

PTS/$ CONVERSION—A value that converts program point values to dollar amount values and vice versa.

STATEMENT—Credit instrument statement created by the Bank.

SUM PERF AMT—The total participant performance obtained by summarizing all performance transactions for a period.

TOTAL ACCOUNT VOLUME—Total dollar amount of all participant credit instrument purchases.

TOTAL ACCT $'s—Total dollar amount of all participants CREDIT $'s that the Bank withdraws from the Incentive Company account to be reimbursed for payments made to the participants' credit instruments.

TOTAL ACCT INTEREST—Total dollar amount accrued by Bank on interest realized on all participant credit instruments' revolving balances.

TOTAL BALANCE—Current award point earnings balance the Bank has on the computer database file.

TOTAL CLNT INV AMT—Summarization of CLNT INV AMT for all participants that is then forwarded to the client.

TOTAL FULFILL INV AMT—Total dollar amount for all participant orders that the client is responsible to pay to the Incentive Company for a processing period.

TOTAL REMIT AMT—Dollar amount the client transfers to the Incentive Company to pay for invoiced amounts received.

TOTAL TRANSFER AMT—Total award points that a participant requests to have transferred from withholding amounts to available credit amounts and vice versa.

TRANS AMT—Dollar amount of the ACCT TRANS FILE record.

VENDOR PAYMENT—Dollar amount remitted to vendors to pay for travel and merchandise that were fulfilled.

VOLUME PAYMENT—Actual dollar amount that Bank will remit to Incentive Company for TOTAL ACCOUNT VOLUME.

VOLUME PAYOUT %—Predetermined percentage that Bank will remit to Incentive Company for each dollar of TOTAL ACCOUNT VOLUME.

WITHHOLD %—This is a multiplier that the participant assigns during enrollment in order to specify the percentage of each period's award point earnings to be held aside and not applied to either any credit instrument debt or not to be disbursed by award certificate issuance.

Overall Perspective

First, an overall perspective will be given for this description.

FIG. 1 shows, from functional block 20 through functional block 288, parts of the system and method involving the storing into the memory of the central processing unit (CPU) of the computer the identification information for the individuals who are to participate in the incentive award program, and the programming and processing of computer programs implementing the system and method of the invention.

FIG. 1.1 details the storing of the identification information of those individuals. It shows the checking of the validity of the participant's participation in the program and the assignment of a number to the participant as well as the preparation of a list of participants.

Block 64 of FIG. 1 is expanded upon in FIG. 1.2 It shows the system and method for the assignment of objectives to be attained by the participants under the incentive program rules, and the storing of the information on the objectives in the computer memory.

Block 120 in FIG. 1, and FIG. 1.3 which expands upon Block 120, cover the computerized production of the enrollment forms for each of the qualified participants. The credit instrument account number for each participant is assigned in numerical sequence and stored in the master record on the computer. The sponsoring company, i.e., the client, is provided with forms to be completed by participants.

Block 152 and FIG. 1.4 which expands thereon, shows the computer processing of enrollment forms completed by the participants. A computer file is prepared listing those individuals who agreed to participate in the program. Also shown is the participant's selection of a percentage of the amount eligible for allocation toward the credit instrument account, which the participant can withhold from such use for a special purpose. Also diagrammed is the participant's changing of his or her objective and updating of credit instrument account number if the participant is new to the program.

Blocks 220 through 226 of FIG. 1 show the financial institution's, such as a bank's, review of the enrollment forms and the issuance of credit instruments such as credit cards by the bank to those participants who qualify under the bank's credit standards set for the issuance of the instruments. The bank produces a list of the credit instrument account numbers with corresponding participant identity, and communicates them to the Incentive Company (Co.).

Block 228 of FIG. 1 is expanded upon in FIG. 1.5. It includes comparisons of the accounts list and the master file and the categorizing of participants into two groups, the Option 1 Flag group and the Option 2 Flag group. The OPTION 1 FLAG group comprises those who have credit instruments issued to them under the program, while the OPTION 2 FLAG group comprises those who do not have such an instrument issued to them. Also shown is the correction of errors of both the participant's account number and selected withholding percentage on the computer master file.

Block 266 is expanded upon in FIG. 1.6. It covers the Incentive Co. computer processing of the invoice to the bank for an amount owed by the bank to the Incentive Co. based on the number of credit instruments issued by the bank to participants. This is one way in which the Incentive Co. is paid by the bank under the incentive program. This brings FIG. 1 to a close at Block 288 with the Incentive Co.'s receipt and deposit of the check from the bank for this fee.

FIG. 2 shows the processing of performance information for the participants. The duration of the incentive program may be divided into different time periods. FIG. 2 processing thus can be for each time period.

Block 292 of FIG. 2 is expanded upon in FIG. 2.1. It shows the processing of the client's performance file. It covers the verification of the participant on the master file, and the determination of whether the products for which performance is reported are those qualifying under the incentive program for the awarding of points. A record is made of the participant's performance and a report of the performance is printed.

Block 320 of FIG. 2 is expanded upon in FIG. 2.2. There is shown the examination of the master record by the computer and examination of performance data. A summary of the performance amounts for the program is calculated by the computer.

Block 372 of FIG. 2 is expanded upon in FIG. 2.3. It includes the computer's calculation of the participant's monetary earnings to be used by the participant's credit instrument. The performance of each participant is compared to his or her objective, and a determination made as to whether points and hence dollars are to be awarded for credit instrument use for each participant. Further, the computer makes comparisons of the participant's performance in order to calculate any bonus points to be awarded under the incentive program rules. Computer calculations are also made to deduct the fees incurred for the maintenance of the credit instrument accounts. Calculations are also made for the period withholding amounts, the available credit for the participants, and the participant's earnings.

Block 466 of FIG. 2 is expanded upon in FIG. 2.4. It comprises the production of a non-monetary tape to be forwarded to the bank. It displays total period earnings and the amount paid on the account balance for the prior period. For persons using the credit instrument account in the Option 1 Flag group, the period earnings and credit payments are written to a non-monetary tape record. For the Option 2 Flag group, performance statements and certificates with the earnings information are printed.

Blocks 508 through 512 of FIG. 2 show the forwarding of the performance data to participants, and forwarding to the bank of the non-monetary tape, as well as an encouragement message to be later transmitted to participants.

Blocks 513–515 of FIG. 2 show the receipt and reconciliation of the account balance information. Block 515 is further expanded upon in FIG. 2.5. The balance on the master file is calculated, based on the difference of the participant's earnings to date less the credit payments made to date. Cross-checking for agreement and errors is provided.

Block 534 of FIG. 2 is expanded upon in FIG. 2.6. It includes adjusting the master file records that were not in balance with the account balance records. The types of errors are determined and the proper corrective action and adjustments are made for the earnings, balances, available credits and withholding amounts.

Block 573 of FIG. 2 is expanded upon in FIG. 2.7. It comprises the creation of a monetary tape and a client invoice tape. Comparisons are made regarding the money allocated for available credit under the program and the current account balance. Calculations are made concerning money to be paid from the available credit instrument monetary amount, and the monetary credit available following adjustments. Proper memory records are made of the adjustments. The computer also calculates data and prints it on a client's invoice. In doing this, the credit instrument expenditures are calculated and added to the maintenance fees for the instruments. Monetary tapes are prepared.

In FIG. 2, Blocks 668 through 674 show forwarding the monetary tape to the bank, forwarding the client invoice file tape and report to the client, and forwarding the statement message to the bank.

Block 674 of FIG. 2, which is expanded upon in FIG. 2.8, shows the bank processing of the account statements for the credit instruments. Examination of account numbers is made. The current balances for the participants' credit instruments are updated. The computer makes calculations with the period earnings and period credit paid to update the total balance. The computer memory is updated and the computer prints statements on the accounts. These printed statements are forwarded to the participants through automated mailing, with the option of automated inclusion of stuffers concerning the incentive program or other information.

Block 731 of FIG. 2, which is expanded upon in FIG. 2.9, includes client invoice processing. This is the processing of the client invoice tape. An amount is transferred to the Incentive Co.'s account at the bank for the total remittance by the client. The bank also withdraws the total account monetary amount from the Incentive Co.'s account. The Incentive Co.'s profit is calculated.

FIG. 3 covers the participant's changing of the percent he or she desires to have withheld during the course of the incentive program.

Figure 4:
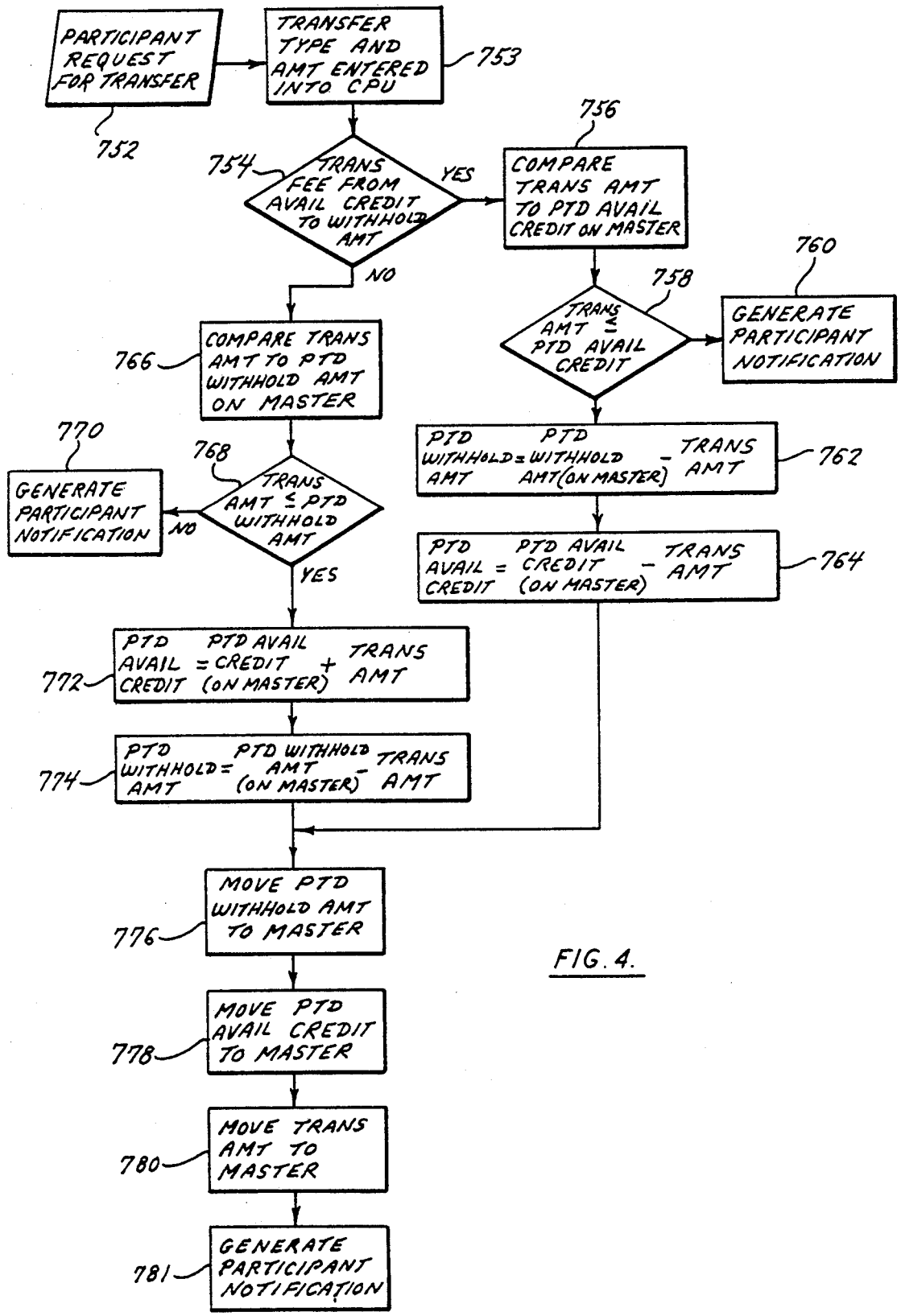
FIG. 4 is a schematic of the system and method showing the transfer of earnings.

FIG. 4 diagrams the processing of a participant's request to transfer an amount between available credit money and the withheld amount. The computer makes up to date adjustments of the available credit and available withholding amount. Notifications of the adjustments are printed for the participants.

Figure 5A:
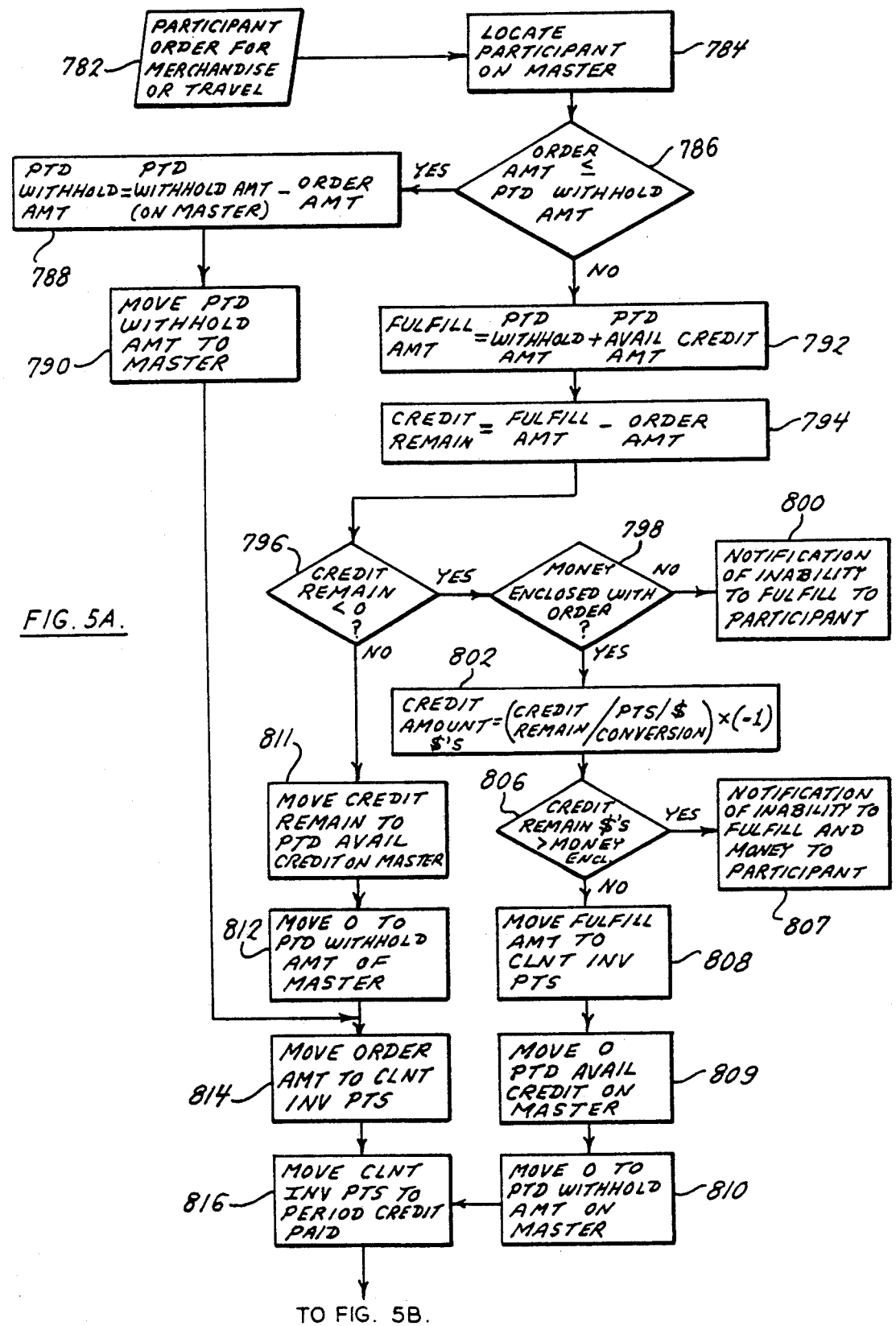
FIG. 5 is a schematic of the system and method, comprising FIG. 5.A, FIG. 5.B, FIG. 5.C, with 5.B being a continuation of FIG. 5.A, and FIG. 5.C being a continuation of 5.B, the Figures showing the fulfillment of participant's request for travel or merchandise for participants who do not have credit instruments issued under the program or participants who may be using credit instruments but for some reason select a certain amount to be withheld for merchandise or travel.

FIG. 5 shows the diagram for the feature of fulfilling a participant's request for travel or merchandise. Those participating with the credit instrument may desire to use the withheld amount to allocate funds for merchandise or travel under the traditional incentive programs. Further, those in the Option 2 Flag group who are not using credit instruments have their awards under the merchandise or travel plan processed.

FIG. 6 shows the computer programming of the monetary payment of the bank to the Incentive Co. for the credit instruments usage. The total payment illustrated is a VOLUME PAYMENT which equals the total monetary amount of expenditures through the credit instruments multiplied by a selected percentage called the VOLUME PAYOUT %. Additionally, the amount paid includes an INTEREST PAYMENT which is equal to the total interest accrued on the credit instrument accounts multiplied by a percentage called the INTEREST PAYOUT %. These two sums are totalled and the payment report is printed by the computer and forwarded to the Incentive Co. along with payment.

More Detailed Description

A more detailed description is now in order. Starting at the top of FIG. 1 at Functional Block 20, the client for whom the incentive program is being administered forwards a tape or transmission to the central processing unit (CPU) of the Incentive Co. The record information on the tape comprises each of the participant's name, address, city, state and zip code and the participant's position within the client organization (i.e. employee ID, dealer number, region number, etc.). The central processing unit (CPU) processes the record at Functional Block 24. This processing is further expanded in FIG. 1.1. FIG. 1.1 shows that at Functional Block 28 a client record is read and examined by a computer application program. The record is edited for the existence of a name in Functional Block 32. If a name is not found on the record, an error report detail line is produced by printing at Functional Block 44. However, if a name does exist, address information on the participant record is examined for validity at Functional Block 36. If the address information is found to be invalid, an error report detail line is produced by printing at Functional Block 44. While if the address information is valid, the company position is edited for validity at Block 40. If the company position proves invalid, an error report detail line is produced by printing at Block 44. On the other hand, if the company position is deemed valid, the computer program establishes a PARTICIPANT NUMBER (NO.) based upon the position of the participant in Block 48. At Block 52, a record is then added to the PARTICIPANT MASTER FILE on the Central Processing Unit of the Incentive Co. At Block 56, using the information in Block 52, a PARTICIPANT NO./name cross reference record is created on the CPU, and a participant listing detail is created by computer printing in Block 60.

Returning to FIG. 1, Block 64 determines if the incentive program rules specify that objectives for participant measurement are to be calculated. The client may decide that rather than having a certain level or multiple levels of objectives, the goal sought will be to simply sell as many units of products as the participant can sell. If this is the case, the participant receives a certain number of program points for each unit sold regardless of whether any minimum number of units are sold. If objectives are, however, desired, Functional Block 72 is performed (this processing is further expanded in FIG. 1.2). Referring to FIG. 1.2, an information record from the PARTICIPANT MASTER FILE is read into a computer program at Block 76. In Functional Block 80, the program determines whether an individual is a qualified participant in the incentive program, or a management level on file for reporting purposes only (in which case processing is discontinued on this record). The client may or may not wish to use a prior period of performance as a basis for establishing the objective for this period. If the client does desire to do so, if the individual is a qualified participant, the computer program accesses the client previous performance file (Block 68). The client previous performance file is a tape or disk file that contains records with the participant's previous time period's sales or other performance information in order to build a basis for measurement of this period's incentive activity. In Block 84 the computer program attempts to find a client previous performance record where the PARTICIPANT NO. matches the PARTICIPANT NO. of the PARTICIPANT MASTER FILE record being processed. Block 88 determines whether or not this match is found. If a match is found, the program objective (OBJ) is calculated at Block 92 as the client sales amount (CLNT SLS) multiplied by the percentage increase that the client wants to achieve over the previous period (OBJ %). However, despite having a percentage increase over the prior period, the client may nevertheless not desire to reward a participant unless a certain level of achievement is met, i.e., a minimum objective. If a minimum objective is employed, once the OBJ is calculated, it is compared to the predetermined minimum objective for the program, selected by the client (MIN OBJ) in Block 96. If the OBJ is less than the MIN OBJ, then the MIN OBJ is assigned to that participant as the OBJ at Block 104. Otherwise, the calculated OBJ becomes his assigned OBJ. Returning to Block 88, if the participant is not found on the client sales tape, then an error detail report line is printed in Block 108 and the default objective (DEFAULT OBJ) is moved to OBJ in Block 112. DEFAULT OBJ is a predetermined number that is assigned by the client. At Block 100, the OBJ is updated on the PARTICIPANT MASTER FILE record. In Block 116, an OBJ listing report detail line is produced through printing.

Returning to FIG. 1, once objectives have been calculated or no objectives were required, enrollment forms are generated by the central processing unit. This is accomplished in block 120 by a computer program. Reference is made to FIG. 1.3 where this processing is further explained. In Block 124, a PARTICIPANT MASTER FILE record is read from the CPU by the program. Block 128 determines whether the PARTICIPANT NO. represents a qualified participant. If it is determined that the individual is not a qualified participant, then processing is discontinued on the PARTICIPANT MASTER FILE record. If the participant is qualified to participate, then an ACCT NO. is generated as the PREVIOUS ACCT NO. plus 1, as shown at Block 132. (Note PREVIOUS ACCT NO. is assigned as the first account number assigned by the Bank minus 1, and then is reassigned as the last ACCT NO. for each subsequent PARTICIPANT MASTER FILE record processed). In Block 134 enrollment forms (ENROLL FORM) are passed to the computer program. The ENROLL FORMS contain the rules of the incentive program, credit card disclosure information and agreements, objectives (if they exist), and areas for the participant to enter information, such as agreement to participate and Bank references for credit card issuance. In Block 136 the computer program controls a printer to print the ACCT NO., PARTICIPANT NO., name, address and OBJ (if OBJ was calculated for the incentive program) for the PARTICIPANT MASTER FILE record in process on the ENROLL FORM from Block 134. The computer program then updates the PARTICIPANT MASTER FILE record with the ACCT NO. in Block 140. Once all PARTICIPANT MASTER FILE records have been processed, extra ENROLL FORMS from Block 134 are manually affixed with ACCT NO.'s for new client personnel that were not contained on the PARTICIPANT MASTER FILE record, in Block 144. The ENROLL FORMS are then forwarded, such as through mailing, at Block 148 to the client personnel who are responsible for explaining the program to the participants and encouraging them to participate.

Returning to FIG. 1, at Block 120, the client personnel distributes as by mail or personal visit the ENROLL FORMS to the participants. The participants complete and sign the ENROLL FORMS and return them to the Incentive Co, (Block 156). At Block 160, the completed ENROLL FORMS are then processed against the PARTICIPANT MASTER FILE record through use of an on-line computer applications program. This processing is explained in FIG. 1.4. A completed ENROLL FORM is examined in Block 156. In Block 164, the PARTICIPANT NO. is entered into the on-line computer applications program to determine whether the PARTICIPANT MASTER FILE record is on file. If the participant is new and not on the master file, a PARTICIPANT NO. is assigned in Block 168 and a PARTICIPANT MASTER FILE record is created for the participant using the information completed on the ENROLL FORM in Block 172. The ACCT NO. is then updated on this newly created record in Block 176. Returning to Block 164, if the PARTICIPANT MASTER FILE record was located, then Block 180 determines whether the name or address was changed on the ENROLL FORM. If the name or address was changed, this information is updated on the PARTICIPANT MASTER FILE record through the on-line computer program. After processing in Blocks 164 to 184 is completed, the ENROLL FORM is examined in Block 188 to see if the participant agrees to participate in the incentive program. If the participant declines, the on-line program updates the INACTIVE CODE on the PARTICIPANT MASTER FILE record in Block 192, and no further processing is done on this record. But if in Block 188 the participant agrees, then the on-line program updates the ACTIVE CODE on the PARTICIPANT MASTER FILE record in Block 196. At Block 200 the social security number (SSNO) that has been written on the ENROLL FORM by the participant is updated on the master record. The invention provides for the participant to have the option to withhold a percentage of his award earnings from the incentive program for use at a later date, and not have the full amount of his earnings applied to his credit instrument balance. This WITHHOLD AMOUNT can be applied to traditional merchandise or travel awards as will be later explained in FIG. 5. When this option is provided, and the participant wants to have this option, this information is relayed to the Incentive Company on the ENROLL FORM and is updated on the PARTICIPANT MASTER FILE (WITHHOLD %) in Block 204.

The client may provide the option of a participant selecting higher objectives with corresponding higher awards for meeting the higher objectives. If such is provided, Block 208 determines if the participant chooses to raise his objective to move into a higher incentive award earning bracket. If the objective on the ENROLL FORM was changed, then the on-line program updates the OBJ on the PARTICIPANT MASTER FILE record at Block 212. If the objective was not changed in Block 208, but Block 216 determines that the participant is new on the master file and an objective is required, then objectives are calculated at Block 72 as explained in FIG. 1.2 above.

Returning to FIG. 1, the ENROLL FORMS are then forwarded as by mail to the Bank in Block 220, where credit information on the ENROLL FORMS is reviewed and credit instruments are issued to the credit qualifying participants in Block 222. The participants are then divided into two categories. One, the OPTION 1 FLAG group, comprises those whose earnings will be applied to use through credit instruments. The second category, the OPTION 2 FLAG group, comprises those not participating with the credit instrument but whose earnings will be applied only toward merchandise or travel awards. This second group exists because some of the participants may not be able to qualify for the bank's standards for issuance of a credit instrument. In accordance with such division, at Block 224, the Bank then produces, as by use of a micro computer, a list of the account numbers for which credit instruments have been issued (ACCT LIST), and transmits the ACCT LIST from the micro computer disk file to the CPU of the Incentive Co. via telecommunications in Block 226. The ACCT LIST is then processed in Block 228. FIG. 1.5 further explains this processing. A computer program compares the ACCT NO. from the Bank ACCT LIST record (Block 230) to the ACCT NO. on the PARTICIPANT MASTER FILE record in Block 232. If a PARTICIPANT MASTER FILE record is found by the computer program that matches the ACCT NO. in Block 236, the computer program updates the OPTION 1 FLAG on the PARTICIPANT MASTER FILE record in Block 240. This reflects the fact that program earnings will be used to downgrade balances on the participant's credit instrument account. Returning to Block 236, if a match is not found on the two files, but it is determined that ACCT NO. is on a PARTICIPANT MASTER FILE record in Block 244, the computer program updates the OPTION 2 FLAG on the PARTICIPANT MASTER FILE record in Block 248. This reflects the fact that award earnings will be paid to the participant in the form of certificates that are redeemable through the Incentive Co. for merchandise or travel awards instead of being used to make payments on a credit instrument account. Returning to Block 244, if the ACCT NO. is not on the PARTICIPANT MASTER FILE record but on the ACCT LIST file, an error report detail line is produced by printing in Block 252.

The credit instruments issued can be credit cards such as those made of plastic with the ACCT NO. and participant's name shown thereon, as well as identification of the issuing financial institution. The participant's signature can be placed on the back as known in the art. The trade name, trademark such as a logo, or other visible identification of the client can be visually shown on the card. This is a constant reminder to the participants of the sponor client and of its products or services.

The credit card shown in FIG. 7 pictures the client's trade name, Jones Mfg. Co., and its stylized trademark, JMC, along with the participant's name and account number, as well as the financial institution's name.

The participants are more likely to use the participating bank's credit instrument than some other credit instrument they hold, since they will be using the sponsor client's instrument to use the money awarded to that instrument account. The amount available for use may also be less than the full price of the item or items purchased, in which case money is spent through the instrument beyond just that generated by the incentive program.

Once all records on both files are processed by the computer program, the error report detail lines are processed as follows. Block 253 determines whether a copy of the ENROLL FORM exists in the Incentive Co. files for the ACCT NO. on the error report detail line. This is accomplished by manually examining the files. If the copy of the ENROLL FORM is not found, the Bank is notified by telecommunications in Block 255 and enrollment information is gathered from the Bank in Block 256 via telecommunications or by receipt of an ENROLL FORM copy from the Bank. When the enrollment information is obtained by either the successful location of the copy of the ENROLL FORM or the receipt of the information from the Bank, an on-line program is utilized to update the ACTIVE CODE on the PARTICIPANT MASTER FILE record in Block 260, update the ACCT NO. on the master record in Block 261, update the WITHHOLD % on the master record in Block 262, and update the OPTION 1 FLAG in Block 264 on the master record.

Returning to FIG. 1, at Block 266 the Bank is invoiced by computer printer and automatic mailer for a credit instrument fee based upon the total number of qualified credit instruments that were established for the incentive program. This processing is further explained in FIG. 1.6. A computer program processes the PARTICIPANT MASTER FILE record on the CPU in Block 268. The program attempts to read a PARTICIPANT MASTER FILE record in Block 270. Block 272 determines whether this read was successful and there is a PARTICIPANT MASTER FILE record remaining to be processed on the file or whether all records have been processed by the invoice computer program. If a record remains to be processed, the program examines the OPTION 1 FLAG on the PARTICIPANT MASTER FILE record in Block 274. If the OPTION 1 FLAG exists on the PARTICIPANT MASTER FILE record in Block 276, then NO. INVCD is calculated as NO. INVCD plus 1 in Block 278 and the computer program returns to Block 270 to read the next PARTICIPANT MASTER FILE record. If the OPTION 1 FLAG does not exist in Block 276, then the computer program returns to Block 270 to read the next PARTICIPANT MASTER FILE record. Returning to Block 272, if the program determines that all PARTICIPANT MASTER FILE records have been processed, the program calculates BANK INVC AMT in Block 280 by multiplying NO. INVCD calculated above by ENROLL MEMBER FEE (this is the dollar amount the Bank has agreed to pay the Incentive Co. for each credit instrument issued). The computer program then produces an invoice report containing the BANK INVC AMT in Block 282. The invoice report is then forwarded to the Bank as by mail in Block 284.

Returning to FIG. 1, upon receipt of the invoice report, the Bank produces a check as by printing, in the amount of the BANK INVC AMT, and forwards the check as by mail to the Incentive Co. in Block 286. The Incentive Co. receives the check and deposits it to the Incentive Co.'s bank in Block 288.

During the incentive program, reporting periods may be designated by the program rules. The reporting periods may be based upon a monthly, weekly, or quarterly schedule depending on the client's wishes. Upon completion of the period, award earnings are calculated based upon the participant performance for that period. Such processing is described by FIG. 2. The period processing is initiated in Block 290 by receipt of client performance record. This information is received via tape, transmission or on printed reports. The information is processed in Block 292 by computer program on the CPU. The processing is explained in detail in FIG. 2.1, to which reference is now made. In Block 294, a client period performance record is read by the computer program. In Block 296, the PARTICIPANT NO. on the record is examined, and in Block 298 the computer program accesses the PARTICIPANT MASTER FILE record to determine whether the record's PARTICIPANT NO. matches a PARTICIPANT NO. on the PARTICIPANT MASTER FILE record. If the PARTICIPANT NO. is not found on the PARTICIPANT MASTER FILE record, an error report detail line is created by printing in Block 300, and processing is discontinued on this client period performance record. If the PARTICIPANT NO. is found, the PRODUCT ID of the client period performance record is examined in Block 302. The rules of the incentive program selected may award participants for sales of certain of the client's products, such as certain model numbers, but not all of the client's products. It is thus necessary to determine if the participant's sales are of the type that qualify under the rules for points to be awarded. In Block 304, the computer accesses the client product file resident on the CPU to determine whether the PRODUCT ID on the record matches a valid PRODUCT ID for the incentive program. If a match is not found on PRODUCT ID, an error report detail line is produced by printing in Block 308, and processing is discontinued on this client period performance record. If a match was found, a performance transaction record is written to the performance transaction file for this PARTICIPANT NO. on the CPU in Block 312, and a performance transaction detail listing is produced by printing in Block 316.

Returning to FIG. 2, once all client period performance records have been processed, the performance transaction file is summarized in Block 320. This processing is further detailed in FIG. 2.2. The processing commences with an applications computer program accessing the PARTICIPANT MASTER FILE record on the CPU in Block 324. The computer program examines a PARTICIPANT MASTER FILE record in Block 328 and determines whether an ACTIVE CODE exists on the record in Block 332. If an ACTIVE CODE does not exist, processing of the PARTICIPANT MASTER FILE record is discontinued. If an ACTIVE CODE does exist, the computer accesses the performance transaction file on the CPU in Block 336 and searches the file for a performance transaction with a PARTICIPANT NO. equal to the PARTICIPANT NO. of the PARTICIPANT MASTER FILE record in process in Block 340. If a performance transaction exists, the computer program examines the period of the transaction in Block 348 and determines whether the period of the transaction is less than or equal to the current period being processed in Block 352. If the period of the transaction is not less than or equal to the current period, then the computer program returns to Block 336 and examines the performance transaction file for the next transaction to be processed. If the period is less than or equal to the current period in Block 352, the computer program examines the posting flag in the performance transaction record in Block 356, and determines whether the posting flag is equal to 'x' in Block 360 (this means that the participant has already been given credit for this transaction in an earlier period). If the posting flag is equal to 'x', then the computer program returns to Block 336 and examines the performance transaction file for the next transaction to be processed. If the posting flag is not equal to 'x', SUMM PERF AMT is calculated in Block 364 as SUMM PERF AMT (the amount calculated on previous performance transaction processed for this PARTICIPANT NO. during this processing) plus PERF TRANS SALES AMOUNT of the performance transaction currently being processed. The computer program then moves an 'x' to the posting flag in the performance transaction in Block 368 and then returns to Block 336. Returning to Block 340, if the computer program determined that all performance transaction records have been processed for this PARTICIPANT NO., then SUMM PERF AMT is moved to the PAR- TICIPANT MASTER FILE record in process in Block 342.

Returning to FIG. 2, once all PARTICIPANT MASTER FILE records have been processed in Block 320, period earnings are calculated in Block 372. If a specific objective for performance has been set under the rules, a determination is made as to whether the points earned by the participant for performance during the period are sufficient to earn any points. This processing is detailed in FIG. 2.3. A computer program is utilized to process the PARTICIPANT MASTER FILE record in Block 376. The computer program examines a PARTICIPANT MASTER FILE record in Block 380 and determines whether an ACTIVE CODE exists on the record in Block 382. If an ACTIVE CODE does not exist, processing of the record is discontinued. If an ACTIVE CODE does exist, the computer program compares the SUMM PERF AMT of the record to the OBJ of the PARTICIPANT MASTER FILE record in Block 384. Block 386 determines whether the SUMM PERF AMT is greater than or equal to the OBJ. If it is not, the computer program moves zero to OBJ PTS in Block 388, moves zero to BONUS PTS in Block 390, moves zero to BONUS AMT in Block 392 and moves zero to PERIOD MAINT FEE in Block 394, then proceeds to Block 402. This means that because the specific objective has not been met, the participant receives no points.

Returning to Block 386, if SUMM PERF AMT is greater than or equal to OBJ, the program moves OBJ EARN to OBJ PTS in Block 396 (OBJ EARN is an award amount determined by the program rules that the participant receives for performing up to the objective that is assigned). This means the participant earns the points that were assigned for reaching the objective. Additionally, the rules may provide for the participant to receive more points, or bonus points, for performing in excess of the set objective. If so, in Block 396, BONUS AMT is calculated as SUMM PERF AMT less OBJ. In Block 400, BONUS PTS are calculated as BONUS AMT multiplied by the BONUS PTS MULTIPLIER (this is a value that is determined by the program rules and signifies the amount of award earnings for each incremental unit of performance above the assigned objective).

The computer then proceeds to Block 402. In Block 402, PERIOD EARNINGS are calculated as the sum of OBJ PTS and BONUS PTS. If the participant belongs to the OPTION 1 FLAG group, the fees related to maintaining the participant's credit instrument are properly treated. The computer then examines the OPTION 1 FLAG on the PARTICIPANT MASTER FILE record in Block 404 and determines whether the OPTION 1 FLAG exists in Block 406. If the OPTION 1 FLAG does not exist, the computer program proceeds to Block 428. If the OPTION 1 FLAG does exist, then the computer program examines the PERIOD MAINT FEE FLAGS on the PARTICIPANT MASTER FILE record in Block 408, and determines whether there are any PERIOD MAINT FEE FLAGS that correspond to periods less than or equal to the current processing period in Block 410. If there are not any PERIOD MAINT FEE FLAGS less than or equal to the current processing period, the program proceeds to Block 428. If there are PERIOD MAINT FEE FLAGS less than or equal to the current processing period, the computer program examines the first of these flags and determines if it is equal to 'x' in Block 412. If the flag is equal to 'x', the program returns to Block 408 to examine the remaining PERIOD MAINT FEE FLAGS. If the flag is not equal to 'x', in Block 412, in Block 413, the computer program determines whether the MAINT CHARGE is to be paid by the participant by deducting this amount from his earnings or whether the MAINT CHARGE will be paid by the client. If the MAINT CHARGE is not paid by the participant, MAINT CHARGE is added to PERIOD MAINT FEE in Block 414 and the computer program returns to Block 408 to examine the remaining PERIOD MAINT FEE FLAGS. Returning to Block 413, if it is determined that the MAINT CHARGE is to be paid by the participant, processing continues at Block 416. In Block 416, the computer converts MAINT CHARGE from a dollar amount to PROJ MAINT PTS by multiplying MAINT CHARGE by PTS/$ CONVERSION. (MAINT CHARGE is a predetermined dollar amount that the Incentive Co. charges the participants during a specified number of processing periods to cover the cost of administering their credit instrument account.) The maintenance charges are then deducted from the earnings for the period. In Block 418, PROJ PERIOD EARNINGS are calculated as PERIOD EARNINGS less PROJ MAINT PTS. In Block 420 it is determined whether the PROJ PERIOD EARNINGS are greater than or equal to zero. If the PROJ PERIOD EARNINGS are not greater than or equal to zero, the computer proceeds to Block 428. If the PROJ PERIOD EARNINGS are greater than or equal to zero, MAINT CHARGE is added to PERIOD MAINT FEE in Block 422, PROJ PERIOD EARNINGS are moved to PERIOD EARNINGS in Block 424, and the PERIOD MAINT FEE FLAG in process is updated with an 'x' in Block 426. The program returns to Block 408 to examine the remaining PERIOD MAINT FEE FLAGS.

As noted, participants may choose to have a certain portion of their earnings withheld. If that is the case, then in Block 428, such a period withholding amount (PERIOD WITHHOLD AMT) is calculated as PERIOD EARNINGS multiplied by the WITHHOLD %. Period available credit (PERIOD AVAIL CREDIT) is the amount that is available to pay on the participant's credit card balance. This figure is calculated in Block 430 by subtracting the PERIOD WITHHOLD AMT from PERIOD EARNINGS. PTD EARNINGS are calculated in Block 432 as PTD EARNINGS on the PARTICIPANT MASTER FILE record in process plus PERIOD EARNINGS. Program to date credit available (PTD AVAIL CREDIT) is then calculated in Block 434 by adding PERIOD AVAIL CREDIT to PTD AVAIL CREDIT on the PARTICIPANT MASTER FILE record in process. Program to date withhold amount (PTD WITHHOLD AMT) is then calculated in Block 436 by adding PERIOD WITHHOLD AMT to PTD WITHHOLD AMT on the PARTICIPANT MASTER FILE record. PTD MAINT FEE is calculated in Block 438 by adding PERIOD MAINT FEE to PTD MAINT FEE on the PARTICIPANT MASTER FILE record in process. Next the computer program updates the PARTICIPANT MASTER FILE record in process with BONUS PTS in Block 440, PERIOD EARNINGS in Block 442, PERIOD MAINT FEE in Block 444, PERIOD WITHHOLD AMT in Block 446, and PERIOD AVAIL CREDIT in Block 448. The computer program then moves to the PARTICIPANT MASTER FILE record PTD EARNINGS in Block 450, PTD AVAIL CREDIT in Block 452, PTD WITHHOLD AMT in Block 454 and PTD MAINT FEE in Block 456.

Returning to FIG. 2, once period award earnings calculations processing has been completed for all PARTICIPANT MASTER FILE records, it is necessary to create a NON-MONETARY TAPE in Block 466 that will be forwarded to the Bank displaying total earnings for this period and total amount that was paid on the account balance for the prior period. FIG. 2.4 describes this process in further detail. A computer program is utilized to access the PARTICIPANT MASTER FILE record in Block 468. The program then reads a PARTICIPANT MASTER FILE record and examines the ACTIVE CODE in Block 470. The program then determines whether an ACTIVE CODE exists on the PARTICIPANT MASTER FILE record. If an ACTIVE CODE does not exist, processing is discontinued on this record. If an ACTIVE CODE does exist, the PARTICIPANT MASTER FILE record is examined for the existence of an OPTION 1 FLAG in Block 476. If an OPTION 1 FLAG exists, the ACCT NO. of the PARTICIPANT MASTER FILE record in process is moved to a NON-MONETARY TAPE record in Block 478, PERIOD EARNINGS are moved to the NON-MONETARY TAPE record in Block 480, and PERIOD CREDIT PAID from the PARTICIPANT MASTER FILE record is moved to the NON-MONETARY TAPE record in Block 482. The NON-MONETARY TAPE record is then written to magnetic tape in Block 484 and the program discontinues processing this record. Returning to Block 476, if an OPTION 1 FLAG does not exist, the computer program moves the PARTICIPANT NO. to the Performance Statement (PERF STATEMENT) in Block 486, then moves the name and address from the PARTICIPANT MASTER FILE record to the PERF STATEMENT in Block 488, PTD EARNINGS from the PARTICIPANT MASTER FILE record to the PERF STATEMENT in Block 490 and PERIOD EARNINGS from the PARTICIPANT MASTER FILE record to the PERF STATEMENT in Block 492. The PERF STATEMENT is then printed by computer in Block 494. In Block 496, the PERIOD AVAIL CREDIT on the PARTICIPANT MASTER FILE record is examined. Block 498 determines whether the PERIOD AVAIL CREDIT is greater than zero. If the PERIOD AVAIL CREDIT is not greater than zero, processing is discontinued on this PARTICIPANT MASTER FILE record.

If PERIOD AVAIL CREDIT is greater than zero, PARTICIPANT NO. is moved to the Award Certificate (CERT) in Block 500, name is moved to the CERT in Block 502 and PERIOD AVAIL CREDIT is moved to the CERT in Block 504. The CERT is then printed in Block 506 and processing of this PARTICIPANT MASTER FILE record is discontinued. Returning to FIG. 2, the PERF STATEMENT and CERTS are then forwarded to the participants such as by mail in Block 508. The NON-MONETARY TAPE record is forwarded to the Bank as by mail in Block 510. Block 511 determines whether statement stuffers are to be forwarded to the Bank. These stuffers may comprise promotional documents for the client's products or services, or documents to encourage the participants to perform under the rules, or other advertisements and the like. If statement stuffers are to be forwarded, the statement stuffers are mailed to the Bank in Block 512.

In Block 513, the Bank produces an ACCT BAL FILE by use of a micro computer and transmits the ACCT BAL FILE from the micro computer to the central processing unit of the INCENTIVE CO. in Block 514. The file comprises ACCT NO., current account balance (CUR BAL) and TOTAL BALANCE (this number reflects the total earnings accrued during the program less any payments made to the credit balance). In Block 515 the TOTAL BALANCE is reconciled against the PARTICIPANT MASTER FILE record to assure that both ACCT BAL FILE and PARTICIPANT MASTER FILE record are in agreement. This processing is further detailed in FIG. 2.5. A computer program is utilized to read a record from the PARTICIPANT MASTER FILE record in Block 516 and access the ACCT BAL FILE in Block 517. At Block 518, the computer program searches the ACCT BAL FILE for a record that has an ACCT NO. equal to the ACCT NO. on PARTICIPANT MASTER FILE record in process. Block 520 determines whether the ACCT NO. is on the ACCT BAL FILE.

If no match is found in Block 520, the computer program examines the OPTION 1 FLAG in Block 528. If it is determined that an OPTION 1 FLAG does not exist in Block 530, processing is discontinued on the PARTICIPANT MASTER FILE record. If it is determined that an OPTION 1 FLAG does exist in Block 530, an error report detail line is produced by computer printing in Block 531. Returning to Block 520, if it is determined that there is an ACCT BAL FILE record that has an ACCT NO. equal to the PARTICIPANT MASTER FILE record in process, MASTER BALANCE is calculated in Block 522 as PTD EARNINGS from the PARTICIPANT MASTER FILE record minus PTD CREDIT PAID from the PARTICIPANT MASTER FILE record. BALANCE DIFFERENCE is then calculated in Block 524 as MASTER BALANCE less TOTAL BALANCE from the ACCT BAL FILE record. In Block 526 the computer program determines whether the BALANCE DIFFERENCE is equal to 'zero'. If the BALANCE DIFFERENCE is equal to 'zero', the records are in agreement and processing on the PARTICIPANT MASTER FILE record is discontinued. If BALANCE DIFFERENCE is not equal to 'zero', an error report detail line is created by computer printing at Block 531.

Returning to FIG. 2, the PARTICIPANT MASTER FILE records that were not in balance with the ACCT BAL records are adjusted in Block 534 using the report created in FIG. 2. This processing is further detailed in FIG. 2.6. This process begins with the examination of the report detail line in Block 536. The error type of the detail is examined at Block 538. If it is determined in Block 540 that the error is a difference in balance, an on-line computer program is used to access the earning and pay-out history of the PARTICIPANT MASTER FILE record in the CPU in Block 542. If a discrepancy cannot be found in reviewing calculations of the participant record in Block 544, the Bank is contacted as by telecommunications, such as by telephone, and the discrepancy is reported in Block 546. In Block 548, the Bank determines whether the location of the error is in the Bank system. If the error originated at the Bank, an adjustment is made in their system to correct the error in Block 550. However, if the error is determined to be in the Incentive Co. system in Block 548 or the discrepancy was found in Block 544, PTD EARNINGS are recalculated in Block 552 as PTD EARNINGS from the master record plus BALANCE DIFFERENCE. Next it is determined whether the discrepancy affected PTD AVAIL CREDIT or PTD WITHHOLD AMT in Block 554. If PTD AVAIL CREDIT was affected, PTD AVAIL CREDIT is recalculated in Block 556 as the sum of PTD AVAIL CREDIT from the PARTICIPANT MASTER FILE and BALANCE DIFFERENCE. The newly recalculated PTD AVAIL CREDIT is then moved to the PARTICIPANT MASTER FILE record in Block 558 and the recalculated PTD EARNINGS are moved to the PARTICIPANT MASTER FILE record in Block 560 by the on-line computer program. The participant is then notified as by mail or phone as to the adjustment to his earnings in Block 565. Returning to Block 554, if PTD WITHHOLD AMT was affected, PTD WITHHOLD AMT is recalculated in Block 562 as the sum of PTD WITHHOLD AMT from the PARTICIPANT MASTER FILE plus BALANCE DIFFERENCE. The newly recalculated PTD WITHHOLD AMT is then moved to the PARTICIPANT MASTER FILE record in Block 564 and the recalculated PTD EARNINGS is moved to the PARTICIPANT MASTER FILE record in Block 560 by the on-line computer program. The participant is then notified by mail or phone as to the adjustment to his earnings in Block 565.

Returning to Block 540, if it is determined that the BALANCE ERROR is that the participant is reflected as not having an active credit instrument issued to him by the Bank, then in Block 566, the PARTICIPANT MASTER FILE record's Optional Flags are examined through an on-line computer program. If at Block 568 it is determined that the participant is enrolled as an Option 2 Participant, then in Block 570, the on-line program is used to update the Option 2 Flag.

Returning to Block 568, if it is determined that the participant is an Option 1 participant and no activity has occurred to change this status, then the Bank is contacted via telecommunications with enrollment information at Block 572 in order to issue the participant a credit instrument.

Returning to FIG. 2, after all errors have been processed in Block 534, a computer program is utilized in Block 573 to create the MONETARY TAPE that will be sent to the Bank to downgrade the participant's credit instrument outstanding balance and to produce the invoice that will be sent to the client to pay for the amount that was used to downgrade the credit instruments balance. This process is further detailed in FIG. 2.7. The process begins in Block 574 with a computer program accessing the ACCT BAL FILE and the PARTICIPANT MASTER FILE record. In Block 575 the computer program accesses the PARTICIPANT MASTER FILE record. The program then compares by ACCT NO., a record from the ACCT BAL FILE and a record on the PARTICIPANT MASTER FILE record in Block 576. The program then determines whether the ACCT NO. is on both files in Block 580. If the ACCT NO. is not located on both files, the program determines whether the ACCT NO. is on the ACCT BAL FILE in Block 583. If so, then the program produces an error report detail line by printing in Block 583. If the ACCT NO. is not on the ACCT BAL FILE but is on the PARTICIPANT MASTER FILE, the ACTIVE CODE on the PARTICIPANT MASTER FILE is examined in Block 584. If the ACTIVE CODE does exist, the OPTION 1 FLAG is examined for existence in Block 585. If the OPTION 1 FLAG exists, an error report detail line is produced by printing in Block 586. The computer continues processing at Block 642 below. If the ACTIVE CODE does not exist in Block 584, or the OPTION 1 FLAG does not exist in Block 585, processing on this PARTICIPANT MASTER FILE record is discontinued. Returning to block 580, if the ACCT NO. exists on a record on the ACCT BAL FILE and on a record on the PARTICIPANT MASTER FILE record, the CUR BAL of the ACCT BAL FILE record is examined in Block 588. If it is determined in Block 590 that the CUR BAL is not greater than zero, then zero is moved to CREDIT $'s in Block 596 and zero is moved to CREDIT PAID in Block 597. Processing is continued at Block 642 below. Returning to Block 590, if it is determined that the CUR BAL is greater than zero, then the PTD AVAIL CREDIT of the PARTICIPANT MASTER FILE record is examined in Block 592. If it is determined in Block 594 that the PTD AVAIL CREDIT is not greater than zero, then zero is moved to CREDIT $'s in Block 596 and zero is moved to CREDIT PAID in Block 597. Processing is continued at Block 642 below. Returning to Block 594, if it is determined that the PTD AVAIL CREDIT is greater than zero, PTD AVAIL $'s are calculated in Block 598 as PTD AVAIL CREDIT divided by the PTS/$ CONVERSION. The computer program then compares CUR BAL to PTD AVAIL $'s in Block 600. If it is determined in Block 602 that the CUR BAL is greater than or equal to the PTD AVAIL $'s, PTD AVAIL $'s are moved to CREDIT $'s in Block 604, PTD AVAIL CREDIT is moved to CREDIT PAID in Block 606, and 'zero' is moved to PTD AVAIL CREDIT in Block 608. Processing is continued at 616 below. Returning to Block 602, if CUR BAL is not greater than or equal to PTD AVAIL $'s, CUR BAL is moved to CREDIT $'s in Block 610, CREDIT PAID is calculated in Block 612 as CREDIT $'s multiplied by PTS/$ CONVERSION, and PTD AVAIL CREDIT is recalculated in Block 614 as PTD AVAIL CREDIT currently on the PARTICIPANT MASTER FILE record less CREDIT PAID.

In Block 616, the computer determines if any records have been written to the MONETARY TAPE during this processing. If no records have been written, the program creates a Monetary Header Record in Block 618 and writes the record out to the MONETARY TAPE (this can be for example a 1600 B.P.I. magnetic tape) in block 620. The program then creates a Monetary Batch Header Record in Block 622 and writes the record out to the MONETARY TAPE in Block 624. Processing is then continued at Block 626 below. Returning to Block 616, if records exist on the MONETARY TAPE, continue processing at Block 626.

In Block 626, the ACCT NO. of the records in process is moved to the Monetary Record. CREDIT $'s is moved to the Monetary Record in Block 628 and the record is written to the MONETARY TAPE in Block 630. Block 632 determines if this was the last record written to the MONETARY TAPE. If it is not, then processing is continued at Block 642. If it is the last record written to the MONETARY TAPE, then a Monetary Batch Trailer Record is created in Block 634. The Monetary Batch Trailer Record is written to the MONETARY TAPE in Block 636. A Monetary Bank Trailer Record is created in Block 638 and written out to the MONETARY TAPE in Block 640. Processing is continued at Block 642.

In Block 642, the computer program calculates CLNT INV AMT as the sum of CREDIT $'s and PERIOD MAINT FEE (from the PARTICIPANT MASTER FILE Record in process). In Block 644, if CLNT INV AMT is not greater than zero, processing on this record is discontinued. If it is determined in Block 644, that CLNT INV AMT is greater than zero, the PARTICIPANT NO. is moved to the CLNT INV record in Block 646, the CLNT INV AMT is moved to the CLNT INV record in Block 648, and the record is written out to the CLIENT INV TAPE and CLIENT INV REPORT detail line is created as by a computer activated printer in Block 650. TOTAL CLNT INV AMT is recalculated in Block 652 as the sum of the CLNT INV AMT of the record being processed and the previous TOTAL CLNT INV AMT. In Block 654, the program determines if the detail line printed in Block 650 is the last detail on the report. If it is the last detail, move TOTAL CLNT INV AMT to the CLIENT INV REPORT as by printing in Block 656. Processing is then continued at Block 660. Returning to Block 654, if this is not the last record written to the report, processing is continued at Block 660.

In Block 660, CLNT INV AMT is updated on the PARTICIPANT MASTER FILE record in process. PTD AVAIL CREDIT is updated on the PARTICIPANT MASTER FILE record in Block 662, CREDIT PAID is moved to PERIOD CREDIT PAID on the PARTICIPANT MASTER FILE record in Block 664 and CREDIT PAID is added to PTD CREDIT PAID on the PARTICIPANT MASTER FILE record in Block 666. Processing on this record is then discontinued.

Returning to FIG. 2, after all records on both the ACCT BAL FILE and the PARTICIPANT MASTER FILE record have been processed by the computer program in Block 573, the MONETARY TAPE is forwarded to the Bank as by mail in Block 668, the CLNT INV TAPE and CLNT INV REPORT are forwarded to the client as by mail in Block 670, and the STATEMENT MESSAGE is forwarded to the Bank in Block 672. These messages are printed on the statements which the bank later forwards to the participants. The message gives words of congratulations for the participant's performance and/or encouragement to perform well under the program.

In Block 674, the Bank processes account statements for those participants that have credit instruments. FIG. 2.8 further explains the processing of the credit statement by the Bank. The Bank's CPU accesses the BANK ACCT TRANS file on the CPU in Block 674 (this file contains all transactions that the credit instrument holder charged against the account for this period), accesses the MONETARY TAPE from the Incentive Co. in Block 675, (this file contains the information that will be used to downgrade participant's credit instrument's outstanding balance) accesses the ACCT DATA BASE on the CPU in Block 676, accesses the STATEMENT copy from the Incentive Co. in Block 678, accesses the NON-MONETARY TAPE from the Incentive Co. in Block 679 (this is the file containing the total award earnings for this period and the total award amount that was paid on the account balance for the prior period). A computer program then reads an ACCT DATA BASE record in Block 680. In Block 681, the computer program writes the name, address, ACCT #, Interest Info, and CUR BAL to the STATEMENT.

In Block 682, the computer then searches the ACCT TRANS FILE for a record which has an ACCT NO. equal to the ACCT NO. of the ACCT DATA BASE record in process. Block 683 determines if the search was successful and an ACCT TRANS FILE record exists. If an ACCT TRANS FILE record exists with an ACCT NO. equal to the ACCT DATA BASE record, then the ACCT TRANS FILE record is written to the STATEMENT by the computer program in Block 684, the CUR BAL is recalculated at Block 686 by adding the TRANS AMT of the ACCT TRANS FILE record in process to the CUR BAL on the ACCT DATA BASE record. The recalculated CUR BAL is then moved to the ACCT DATA BASE record in Block 688. The computer program then returns to Block 682.

Returning to Block 683, if ACCT TRANS FILE records do not exist with an ACCT NO. equal to the ACCT DATA BASE record in process, the computer program searches the MONETARY TAPE in Block 692 until the program determines whether there is a record on the MONETARY TAPE with an ACCT NO. equal to the ACCT NO. of the ACCT DATA BASE record in Block 694. If a MONETARY TAPE record is not found with an ACCT NO. equal to the ACCT NO. of the ACCT DATA BASE record, processing continues at Block 701. If a record is found, the MONETARY TAPE record is written to the STATEMENT record in Block 696 and CUR BAL is recalculated at Block 698 by subtracting the CREDIT $'s on the MONETARY TAPE record from the CUR BAL on the ACCT DATA BASE record. The recalculated CUR BAL is then moved to the ACCT DATA BASE record in Block 700. The program then continues processing at Block 701.

At Block 701, the computer program writes the CUR BAL to the STATEMENT as the new balance of the account. The computer program then searches the NON-MONETARY TAPE in Block 702, until it determines whether a NON-MONETARY TAPE record exists with an ACCT NO. equal to the ACCT NO. of the ACCT DATA BASE record in process in Block 704. If a match is found, processing continues at Block 710. If a match is not found in Block 704, zero is moved to PERIOD EARNINGS in Block 706 and to PERIOD PAID CREDIT in Block 708. Processing then continues at Block 710. In Block 710, TOTAL BALANCE is recalculated as TOTAL BALANCE currently on the ACCT DATA BASE record plus PERIOD EARNINGS (either calculated in Block 706 or from the NON-MONETARY TAPE record) less PERIOD CREDIT PAID (either calculated in Block 708 or from the NON-MONETARY TAPE record). TOTAL BALANCE on ACCT DATA BASE record is then written to the STATEMENT in Block 712, PERIOD EARNINGS are moved to the STATEMENT record in Block 714, PERIOD CREDIT PAID is moved to the STATEMENT record in Block 716, TOTAL BALANCE (NEW) is moved to the STATEMENT in Block 718.

In Block 720 the TOTAL BALANCE (NEW) is moved to the TOTAL BALANCE on the ACCT DATA BASE record. The STATEMENT is moved to the STATEMENT record in Block 722. The STATEMENT record is then printed by computer in Block 724. The computer program then recalculates TOTAL ACCT $'s in Block 725 as the sum of TOTAL ACCT $'s and the CREDIT $'s of the MONETARY TAPE record in process (this is the amount that the Incentive Co. must remit to the Bank to cover the payments issued to the credit instrument accounts).

When the computer has completed the processing of all records and all STATEMENTS have been printed, processing is continued at Block 726. In Block 726, if statement stuffers were forwarded to the Bank, the stuffers in Block 728 are enclosed with the statements in Block 730 by use of automated stuffing machines and are forwarded to the participants by mail in Block 731. If statement stuffers do not exist in Block 726, the statements are forwarded to the participants in Block 731.

Returning to FIG. 2, the CLNT INV TAPE is processed by the client in Block 731. This processing is further detailed in FIG. 2.9, to which reference is now made. The Client CPU accesses the CLNT INV TAPE in Block 732. A computer program is utilized to read a record from the CLNT INV TAPE in Block 734. If it is determined that records still exist on the CLIENT INV TAPE in Block 736, TOTAL REMIT AMT is calculated in Block 738 as the sum of the INV AMT on the CLNT INV TAPE record and TOTAL REMIT AMT, and the program returns to read the next record on the CLNT INV TAPE in Block 734. If it is determined in Block 736 that no more records exist on the CLNT INV TAPE, then the TOTAL REMIT AMT is transferred to the Incentive Co. account at the Bank in Block 740. In Block 742, the Bank withdraws TOTAL ACCT $'s to cover the payments on the MONETARY TAPE to the credit instrument accounts. The INCENTIVE CO. PROFIT is illustrated in Block 743 as the difference of TOTAL ACCT $'s from TOTAL REMIT AMT.

Requests may be made by participants to change the WITHHOLD % on their accounts. These transactions are made via an on-line computer program in FIG. 3. The participant request to change WITHHOLD % is received by mail or telecommunications in Block 744. The on-line program locates the PARTICIPANT NO. on the PARTICIPANT MASTER FILE and displays the WITHHOLD % in Block 746. The operator updates the WITHHOLD % in Block 748 and the participant is notified of the change by mail or telecommunications in Block 750.

FIG. 4 diagrams the process of transferring amounts from PTD WITHHOLD and PTD AVAIL CREDIT. When a transfer request is received from a participant in Block 752, the amount of the transfer and type of transfer is entered into the CPU in Block 753. If at Block 754 the type is a transfer from PTD AVAIL CREDIT to PTD WITHHOLD AMT, the transfer amount (TRANSFER AMT) is compared at Block 756 to the PTD AVAIL CREDIT on the PARTICIPANT MASTER FILE. If it is determined in Block 758 that the TRANSFER AMT is not less than or equal to the PTD AVAIL CREDIT, then a notification letter of failure to transfer is generated by computer printing and mailed in Block 760. If it is determined in Block 758 that the TRANSFER AMT is less than or equal to the PTD AVAIL CREDIT, then PTD WITHHOLD AMT is recalculated in Block 762 as the sum of the PTD WITHHOLD AMT and TRANSFER AMT. PTD AVAIL CREDIT is recalculated in Block 764 as the difference of TRANSFER AMT from PTD AVAIL CREDIT field on the PARTICIPANT MASTER FILE record. These fields are moved to the PARTICIPANT MASTER FILE record at Block 776 and Block 778, TRANSFER AMT is moved to the PARTICIPANT MASTER FILE record in Block 780 and a notification letter to the participant is generated by computer printing and mailed in Block 781.

Returning to Block 754, if the type is a transfer from PTD WITHHOLD AMT to PTD AVAIL CREDIT, the transfer amount (TRANSFER AMT) is compared to the PTD WITHHOLD AMT on the PARTICIPANT MASTER FILE record in Block 766. If, in Block 768, the TRANSFER AMT is not less than or equal to the PTD WITHHOLD AMT, then a notification letter of failure to transfer is generated by computer printing and mailed in Block 770. If, in Block 768, the TRANSFER AMT is less than or equal to the PTD WITHHOLD AMT, then PTD AVAIL CREDIT is recalculated in Block 772 as the sum of the PTD AVAIL CREDIT on the PARTICIPANT MASTER FILE record and TRANSFER AMT. PTD WITHHOLD AMT is recalculated in Block 774 as the difference of TRANSFER AMT from the PTD WITHHOLD AMT on the PARTICIPANT MASTER FILE record. These fields are moved to the PARTICIPANT MASTER FILE record at Block 776 and Block 778, TRANSFER AMT is moved to the PARTICIPANT MASTER FILE record in Block 780 and a notification letter to the participant is generated by computer printing and mailed in Block 781.

FIG. 5 illustrates the process of fulfilling participant requests for group travel or merchandise for those who are not participating in the credit instrument system and method, or those who are so participating but have chosen to allocate an amount to be withheld for spending on travel or merchandise selections. A participant order for merchandise or travel is entered into the CPU by use of an on-line computer program in Block 782. The program then locates the PARTICIPANT MASTER FILE record on the CPU in Block 784. The on-line program determines whether the ORDER AMT of the participant order is less than or equal to the PTD WITHHOLD AMT of the PARTICIPANT MASTER FILE record in Block 786. If the ORDER AMT is less than or equal to the PTD WITHHOLD AMT, then PTD WITHHOLD AMT is recalculated in Block 788 as PTD WITHHOLD AMT on the PARTICIPANT MASTER FILE record less the ORDER AMT. At Block 790, PTD WITHHOLD AMT is then moved to the PARTICIPANT MASTER FILE record. Processing is then continued at Block 814. Returning to Block 786, if ORDER AMT is not less than or equal to PTD WITHHOLD AMT, then FULFILL AMT is calculated in Block 792 as the sum of PTD WITHHOLD AMT on the PARTICIPANT MASTER FILE record an PTD AVAIL CREDIT on the master. CREDIT REMAIN is then calculated in Block 794 as FULFILL AMT less ORDER AMT. If it is determined in Block 796 that CREDIT REMAIN is less than zero, then the participant order is examined to determine if money was enclosed with the order in Block 798. If money was not enclosed, then a notification of inability to fulfill is generated by computer printing and forwarded to the participant by mail in Block 800. If money was enclosed, CREDIT REMAIN $'s are calculated in Block 802 as CREDIT REMAIN divided by PTS/$ CONVERSION multiplied by −1. If it is determined in Block 806 that CREDIT REMAIN $'s are less than the dollar amount of the money enclosed, then a notification of inability to fulfill is generated by computer and forwarded along with the enclosed money to the participant by mail in Block 807. If it is determined in Block 806 that CREDIT REMAIN $'s are not less than the dollar amount of the money enclosed, then FULFILL AMT is moved to CLNT INV PTS in Block 808, zero is moved to PTD AVAIL CREDIT on the PARTICIPANT MASTER FILE record in Block 809 and zero is moved to PTD WITHHOLD AMT on the PARTICIPANT MASTER FILE record in Block 810. Processing is then continued in Block 816.

Returning to Block 796, if CREDIT REMAIN is not less than zero, then CREDIT REMAIN is moved to PTD AVAIL CREDIT on the PARTICIPANT MASTER FILE record in Block 811 and zero is moved to PTD WITHHOLD AMT on the PARTICIPANT MASTER FILE record in Block 812. Processing is then continued at Block 814. In Block 814, ORDER AMT is moved to CLNT INV PTS. In Block 816, CLNT INV PTS are moved to PERIOD CREDIT PAID on the PARTICIPANT MASTER FILE record and CLNT INV PTS are added to PTD CREDIT PAID on the PARTICIPANT MASTER FILE record in Block 818. PARTICIPANT NO. of the PARTICIPANT MASTER FILE record is moved both to the CLNT INV TAPE record and to the CLNT INV REPORT record in Block 820. In Block 821, CLNT INV AMT is calculated as CLNT INV PTS divided by PTS/$ CONVERSION and then CLNT INV AMT is moved to the CLNT INV TAPE record and to the CLNT INV REPORT record in Block 822. In Block 824, the CLNT INV TAPE record is written to the CLNT INV TAPE and the CLNT INV REPORT record is printed to the CLNT INV REPORT. TOTAL FULFILL INV AMT is calculated in Block 826 as the sum of CLNT INV AMT and TOTAL FULFILL INV AMT for all other orders fulfilled during the Incentive Co. program. CLNT INV PTS are then moved to the PARTICIPANT MASTER FILE record in Block 828 and an order is produced by computer printing for each item that the participant requested on the order form in Block 830. A notification of fulfillment of the order is produced by computer printing and forwarded to the participant in Block 832. If it is determined in Block 834 that this is the last order that is to be fulfilled for this billing period, then TOTAL FULFILL INV AMT is printed on the CLNT INV REPORT in Block 836 and both the CLNT INV TAPE and CLNT INV REPORT are forwarded to the client by mail in Block 840. The client then processes the invoice information in Block 841. Please refer to the discussion of FIG. 2.9 for further discussion of this processing. In Block 842, vendor's of the merchandise or travel requests for payment are received by the Incentive Co. In Block 844, the Incentive Co. forwards the VENDOR PAYMENT to the vendor by mail. FULFILL PROFIT is then calculated in Block 846 as TOTAL INV AMT less the VENDOR PAYMENT.

FIG. 6 describes the Bank payment to the Incentive Co. at the program conclusion. The Bank accesses the ACCT DATABASE resident on their CPU in Block 848. The Bank then utilizes a computer program in Block 850 to retrieve TOTAL ACCOUNT VOLUME for all participants in the incentive program utilizing credit instruments issued by the Bank. The Bank then calculates VOLUME PAYMENT as TOTAL ACCOUNT VOLUME multiplied by VOLUME PAYOUT % in Block 852. Next the computer program retrieves the TOTAL ACCT INTEREST from the ACCT DATABASE in Block 854. INTEREST PAYMENT is then calculated in Block 856 as TOTAL ACCT INTEREST multiplied by INTEREST PAYOUT %. INCENTIVE CO. PAYMENT is then calculated in Block 858 as the sum of VOLUME PAYMENT and INTEREST PAYMENT. In Block 860, a payment report is generated by printing and INCENTIVE CO. PAYMENT is transferred to the Incentive Co. account at the Bank in Block 862. The payment report is then forwarded to the Incentive Co. by mail in Block 864.

The financial institution involved can be of all types, for example, banks, and savings and loan associations.

The invention can be employed by a sponsor company with its own in-house incentive program, without using a separate incentive company. A sponsor company which can act as its own financial institution to issue credit instruments can implement the invention without using an outside incentive company or financial institution.

There are various changes and modifications which may be made to the invention as would be apparent to those skilled in the art. However, these changes or modifications are included in the teaching of the disclosure, and it is intended that the invention be limited only by the scope of the claims appended hereto.

We claim:

1. In a system for an incentive award program for a company having individual program participants and having levels of performance set as goals to be achieved by participants for the company, improvements comprising:
   (a) computer memory means for data storing of information identifying the participants;
   (b) credit instruments for the participants, and computer data processing means for assigning individual credit instrument account numbers and corresponding accounts to the individual participants;
   (c) computer memory means for storing levels of performance to be achieved by the participants under the incentive program in order for the individual participants to have money credited for available use to the individual participants' credit instrument account; and
   (d) computer data processing means for allocating monetary amounts to be credited for available use through the individual participant's credit instruments based on the participant's meeting of a designated level of performance under the incentive program.

2. In the system of claim 1 further comprising computer data processing means for providing an incentive program divided into multiple time periods, and the means for allocating having computer data processing means for allocating monetary amounts for available use through the credit instruments following the end of each said period, said allocated amounts being based upon a participant's meeting of a level of performance by the end of each period.

3. In the system of claim 2, further comprising computer data processing means for calculating the monetary amounts available for use by credit instruments of participants.

4. In the system of claim 2 further comprising computer data processing means for periodic deduction of amounts from the amount available for participant use through the credit instrument, by deducting amounts of money expended through use of the credit instrument.

5. In the system of claim 1, further comprising computer data processing means for withholding, at a selected time, monetary amounts from the said monetary amounts available for allocation for use through the credit instruments, so that the withheld monetary amounts are made available for use by participants.

6. In the system of claim 5 wherein the withheld amount is a selected percentage of the amount available for allocation, and further comprising computer data processing means for adjusting the percentage to be withheld during the course of the incentive program.

7. In the system of claim 1, further comprising computer printer means for preparing a statement for the individual participants reporting the amount of money allocated for use through the participant's credit instrument under the program.

8. In the system of claim 1, further comprising computer memory and computer data processing means for storing and reporting transactions made with participants' credit instruments.

9. In the system of claim 1 further comprising computer data processing means for calculating levels of performance to be achieved by participants in order for the participants to have monetary amounts allocated for use through the participants' credit instrument accounts.

10. In the system of claim 1 wherein the participants are sponsored by a client company and the system is supervised by an incentive company, further comprising computer data processing means for a financial institution to assign the credit instrument accounts to participants, and computer data processing means for the financial institution to be charged an amount payable to the incentive company dependent upon the monetary volume of transactions of the participants through use of credit instruments issued under the incentive program.

11. In the system of claim 10 wherein the amount payable to the incentive company is a portion of the monetary volume of the said credit transactions.

12. In the system of claim 1 wherein the participants are sponsored by a client company and the system is supervised by an incentive company, further comprising computer data processing means for a financial institution to assign the credit instrument accounts to participants, and computer data processing means for the financial institutions to be charged an amount payable to the incentive company which is dependent upon the interest owed to the financial institution through the participants' credit instruments issued under the incentive program.

13. In the system of claim 12 wherein the amount payable through the means for charging the financial institution is a portion of the interest owed by participants under the participants' credit instrument accounts issued under the incentive program.

14. In the system of claim 1 wherein the participants are sponsored by a client company and the system is supervised by an incentive company, further comprising computer data processing means for a financial institution to assign the credit instrument accounts to participants, and computer data processing means for the financial institutions to be charged an amount payable to the incentive company which is dependent upon the number of credit instrument accounts assigned by the financial institution to participants.

15. In the system of claim 1 wherein the credit instruments comprises credit cards, and information identifying the client comprising a tradename or trademark visually appears on the credit cards.

16. In the system of claim 1 further comprising computer data processing means for integrating the awards of allocation of money for use through credit instrument accounts with the award of incentive points toward a vacation or merchandise acquisition of participants.

17. In a system for an incentive award program for a company having individual program participants, and having levels of performance set as goals to be achieved by participants for the company improvements, comprising:
(a) computer memory means for data storing of information identifying the participants;
(b) credit instruments for the participants, and computer data processing means for assigning individual credit instrument account numbers and corresponding accounts to the individual participants;
(c) computer memory means for storing levels of performance to be achieved by the individual participants under the incentive program in order for the individual participants to have money credited for available use to the individual participant's credit instrument account;
(d) computer data processing means for allocating monetary amounts to be credited for available use through the individual participant's credit instruments based on the participant's meeting of a designated level of performance under the incentive program;
(e) computer data processing means for calculating the monetary transactions made through the individual participants' credit instruments;
(f) computer memory means for storing transactions made with the credit instruments of participants; and
(g) computer data processing and computer printer means for preparing a statement for the individual participants reporting the amount of money allocated for use through individual participants' credit instruments and reporting upon the individual participant's performance under the incentive program.

18. In a system for an incentive award program for a company having individual program participants and having levels of performance set as goals to be achieved by participants for the company, improvements comprising:
(a) computer memory means for data storing of information identifying the participants;
(b) credit instruments for the participants, and computer data processing means for assigning individual credit instrument account numbers and corresponding accounts to the individual participants;
(c) computer data processing means for dividing the incentive program into multiple time periods, and computer memory means for storing levels of performance to be achieved by participants under the incentive program in order for the participants to have money credited for available use to the participants' credit instrument accounts at the end of the program time periods;
(d) computer data processing means for allocating monetary amounts to be credited for available use through the individual participants' credit instruments based on the participants' meeting of a designated level of performance under the incentive program at the end of each time period;

(e) computer data processing means for withholding at a selected time monetary amounts from the said monetary amounts eligible for allocation for use through the credit instruments, so that the withheld monetary amounts are made available for use by participants;

(f) computer data processing means and computer printing means for preparing a statement for the individual participants reporting the amount of money allocated for use through the participants' credit instruments for each of the said time periods; and (g) computer memory means for storing, and computer printer means for reporting to participants, the transactions made with the participants' credit instruments.

19. In a method of operating a general purpose digital computer having data storage memory for an incentive award program for a company having individual program participants, and having levels of performance set as goals to be achieved by participants for the company, improvements comprising:

(a) data storing of information identifying the participants in computer memory;

(b) data storing in computer memory of credit instrument account numbers for the individual participants;

(c) data storing in the computer memory of levels of performance to be achieved by the individual participants under the incentive award program in order for money to be credited for available use to the individual participants' credit instrument accounts under the incentive program; and (d) the step of computer comparison of the performance of the individual participants with the performance level necessary for the individual participants to achieve in order to have money credited for available use to their credit instrument accounts, and allocating a monetary amount to be available for use through the individual participant's credit instruments if the comparison shows that the participant has met the level of performance.

20. In the method of claim 19 further comprising the step of a computer printer printing a statement for the individual participants reporting the amount of money allocated for use through the participant's credit instrument under the incentive award program; the step of storing in the computer memory the transactions made with the participants' credit instruments, and the step of a computer printer printing a statement for the individual participants reporting the transactions made with the participants' credit instruments.

21. In the method of claim 19 further comprising the step of data processing for withholding a portion of the amount eligible for allocation for use through the individual participant's credit instruments so that the amount is not available for use through the credit instrument.

22. In the method of claim 21 further comprising the step of computer data processing for withholding a selected percentage of the amount available for allocation, and computer data processing for the step of adjusting the percentage to be withheld during the course of the incentive program.

23. In the method of claim 19 wherein the credit instruments are issued by a financial institution and the system is supervised by an incentive company, further comprising the steps of:

(a) the financial institution assigning the credit instrument accounts to participants by computer data processing; and (b) computer data processing calculation of an amount to be charged to the financial institution payable to the incentive company which is a selected portion of the monetary volume of transactions made through use of credit instruments issued under the incentive program.

24. In the method of claim 19 further comprising the step of computer data processing to calculate levels of performance to be achieved by participants in order for the participants to have monetary amounts allocated for use through the participants' credit instrument accounts.

25. In the method of claim 19 wherein the incentive program is administered by an incentive company, and credit instruments are issued by a financial institution, further comprising the steps of:

(a) the financial institution assigning the credit instrument accounts to participants by computer data processing; and (b) the step of computer calculation of an amount to be charged for payment to the incentive company which is a portion of the monetary interest owed to the financial institution through the participants' credit instruments issued under the incentive program.

26. In the method of claim 19 wherein the incentive program is administered by an incentive company, and the credit instruments are issued by a financial institution, further comprising the steps of:

(a) the financial institution assigning the credit instrument accounts to participants by computer data processing; and (b) the step of computer calculation of an amount to be charged payable to the incentive company based upon the total number of credit instruments issued to the participants under the incentive program.

27. In a system for an incentive award program for a company having individual program participants, and having desired levels of performance to be achieved by individual participants for the company, improvements comprising:

(a) computer memory means for data storing of information identifying the participants;

(b) credit instruments for the participants, and computer data processing means for assigning individual credit instrument account numbers and corresponding accounts to the individual participants;

(c) computer memory means for storing levels of performance to be achieved by the participants under the incentive program in order for the individual participants to have money credited for available use with the credit instrument of the individual from a source other than from funds generated from the participant to the participants' credit instrument accounts; and (d) computer data processing means for allocating monetary amounts from a source other than funds generated from the participant, to be credited for available use through the individual participant's credit instruments based on the participant's meeting of a level of performance under the incentive program.

28. The incentive award program system of claim 27 wherein the money paid to the participants' credit instrument account is deposited into the accounts of the participants after the participants' use of the credit instrument in a transaction.

29. The incentive award program system of claim 27 wherein the computer data processing means assigns individual credit instrument account numbers and corresponding accounts to individual participants without the participants' depositing or paying any money into the account.

30. The system for an incentive award program for participants of claim 27, wherein the participants are sponsored by a client company and the system is supervised by an incentive company, and wherein the credit instruments are issued by a financial institution, further comprising computer data processing means for the client company to process an amount of money to be paid by the client to the financial institution based on the participants' meeting of a level of performance under the incentive award program and upon the participants' use of the credit instrument in purchasing transactions.

31. A system for an incentive award program for participants, comprising:
   (a) computer memory means for data storing of information identifying participants;
   (b) credit instruments for participants, and computer data processing means for assigning individual credit instrument account numbers and corresponding accounts to individual participants;
   (c) computer memory means for storing levels of performance to be achieved by participants under the incentive program in order for the participants to have money paid to the participants' credit instrument accounts;
   (d) computer data processing means for allocating monetary amounts to be available for use through the individual participant's credit instruments based on the participant's meeting of a level of performance under the incentive program; and
   (e) computer data processing means for withholding, at a selected time, monetary amounts from the said monetary amounts credited as available for allocation for use through the credit instruments, so that the withheld monetary amounts withdrawn from crediting are made available for use by participants, the withheld amount being a selected percentage of the amount available for allocation, and further comprising computer data processing means for adjusting the percentage to be withheld during the course of the incentive program.

32. A method of operating a general purpose digital computer having data storage memory comprising:
   (a) data storing of information identifying the participants in computer memory;
   (b) data storing in computer memory of credit instrument account numbers for the individual participants;
   (c) data storing in the computer memory of levels of performance to be achieved by individual participants under an incentive award program in order for money to be paid to the individual participants' credit instrument accounts under the incentive program;
   (d) the step of computer comparison of the performance of the individual participants with the performance level necessary for the individual participants to achieve in order to have money paid to their credit instrument accounts, and allocating a monetary amount to be available for use through the individual participant's credit instruments if the comparison shows that the participant has met the level of performance; and
   (e) the step of computer data processing withholding a portion of the amount eligible for allocation for use through the individual participants credit instruments so that the amount is not available for use through the credit instrument, and the step of computer data processing adjusting the percentage to be withheld during the course of the incentive program.

* * * * *